United States Patent
Kelly et al.

(10) Patent No.: US 10,426,140 B2
(45) Date of Patent: Oct. 1, 2019

(54) DATA-ACQUIRING AND REPORTING ANIMAL COLLAR

(71) Applicant: TRIANGULATE TECHNOLOGIES LLC, Chicago, IL (US)

(72) Inventors: Sean Kelly, Boulder, CO (US); Jonathan Ozeran, Chicago, IL (US)

(73) Assignee: TRIANGULATE TECHNOLOGIES LLC, Chicago, IL (US)

( * ) Notice: Subject to any disclaimer, the term of this patent is extended or adjusted under 35 U.S.C. 154(b) by 231 days.

(21) Appl. No.: 14/752,545

(22) Filed: Jun. 26, 2015

(65) Prior Publication Data
US 2015/0373951 A1 Dec. 31, 2015

Related U.S. Application Data

(60) Provisional application No. 62/017,716, filed on Jun. 26, 2014, provisional application No. 62/017,717, filed on Jun. 26, 2014, provisional application No. 62/017,729, filed on Jun. 26, 2014, provisional application No. 62/017,732, filed on Jun. 26, 2014.

(51) Int. Cl.
*A01K 15/02* (2006.01)
*A01K 27/00* (2006.01)
*A01K 29/00* (2006.01)

(52) U.S. Cl.
CPC .......... *A01K 27/009* (2013.01); *A01K 15/021* (2013.01); *A01K 29/005* (2013.01)

(58) Field of Classification Search
CPC .. A01K 15/021; A01K 27/009; A01K 11/008; A01K 15/02; G08B 21/0288; G08B 21/023

USPC ....... 119/721, 908, 859, 712, 718, 720, 719, 119/421, 702, 858; 340/573.1, 573.3, 340/539.13, 539.11, 539.15
See application file for complete search history.

(56) References Cited

U.S. PATENT DOCUMENTS

| | | | | |
|---|---|---|---|---|
| 6,067,018 A | * | 5/2000 | Skelton | A01K 11/008 119/721 |
| 6,232,880 B1 | * | 5/2001 | Anderson | A01K 15/023 119/421 |
| 6,271,757 B1 | * | 8/2001 | Touchton | A01K 15/02 119/721 |
| 6,310,553 B1 | * | 10/2001 | Dance | A01K 11/008 119/718 |
| 6,437,727 B2 | * | 8/2002 | Lemelson | G01S 19/18 342/45 |

(Continued)

*Primary Examiner* — Yvonne R Abbott-Lewis

(57) ABSTRACT

Methods, systems, and devices for acquiring data from and communicating with a wearable device (e.g., a collar) affixed to animal are described. A wearable device affixed to a dog, for example, may acquire data and transmit the data to mobile devices or servers using one or several wireless technologies. The wearable device may also receive signaling, which may be indicative of commands to or feedback for the animal wearing the wearable device. The data acquired from the wireless device may be used for monitoring and communicating with an animal by, for example, generating reports, developing training or feeding schedules, or conveying relevant information to animal owners. Likewise, signaling sent to the device may facilitate interaction between an animal and the animal's owner, between the animal and its surroundings, or between multiple animals.

1 Claim, 23 Drawing Sheets

(56) References Cited

U.S. PATENT DOCUMENTS

| | | | | |
|---|---|---|---|---|
| 6,581,546 B1 * | 6/2003 | Dalland | A01K 15/023 | 119/712 |
| 6,720,879 B2 * | 4/2004 | Edwards | A01K 15/021 | 340/12.51 |
| 7,034,695 B2 * | 4/2006 | Troxler | G01C 21/005 | 340/539.11 |
| 7,098,790 B2 * | 8/2006 | Hisano | A01K 15/021 | 119/858 |
| 7,409,924 B2 * | 8/2008 | Kates | A01K 15/02 | 119/719 |
| 7,486,181 B2 * | 2/2009 | Olsen | B60R 25/1004 | 340/505 |
| 7,634,975 B2 * | 12/2009 | Kates | A01K 15/02 | 119/712 |
| 7,864,057 B2 * | 1/2011 | Milnes | A01K 15/023 | 119/721 |
| 8,126,410 B2 * | 2/2012 | Alon | H01Q 9/0442 | 343/702 |
| 8,188,869 B2 * | 5/2012 | Wangrud | A01K 11/008 | 340/539.13 |
| 8,438,999 B2 * | 5/2013 | Hardi | A01K 15/021 | 119/718 |
| 8,457,595 B2 * | 6/2013 | MacInnis | A61B 5/0024 | 382/115 |
| 8,543,134 B2 * | 9/2013 | Lopez | A01K 15/021 | 455/411 |
| 8,624,743 B2 * | 1/2014 | Langer | A01K 15/021 | 119/718 |
| 8,723,733 B2 * | 5/2014 | Tran | H01Q 1/085 | 343/700 MS |
| 8,839,744 B1 * | 9/2014 | Bianchi | G08B 23/00 | 119/720 |
| 2005/0000468 A1 * | 1/2005 | Giunta | A01K 15/023 | 119/721 |
| 2005/0066912 A1 * | 3/2005 | Korbitz | A01K 15/023 | 119/721 |
| 2007/0204804 A1 * | 9/2007 | Swanson | A01K 15/023 | 119/721 |
| 2008/0036610 A1 * | 2/2008 | Hokuf | A01K 11/008 | 340/573.3 |
| 2008/0159079 A1 * | 7/2008 | Dir | A01K 97/125 | 367/139 |
| 2009/0071413 A1 * | 3/2009 | Stapelfeld | A01K 15/023 | 119/712 |
| 2010/0045463 A1 * | 2/2010 | Bradley | A01K 11/008 | 340/573.1 |
| 2012/0204811 A1 * | 8/2012 | Ryan | A01K 15/021 | 119/720 |

\* cited by examiner

DATA-ACQUIRING AND REPORTING ANIMAL COLLAR

CROSS REFERENCES

This Application for Patent claims priority to U.S. Provisional Patent Application No. 62/017,716 by Kelly, entitled "Data-Acquiring and Reporting Animal Collar," filed Jun. 26, 2014, and to U.S. Provisional Patent Application No. 62/017,717 by Kelly et al., entitled "Data Analytics Utilizing Animal Collar-Acquired Data," filed Jun. 26, 2014, and to U.S. Provisional Patent Application No. 62/017,729 by Kelly, entitled "Cordless Animal Leash," filed Jun. 26, 2014, and to U.S. Provisional Patent Application No. 62/017,732 by Snow et al., entitled "Power Leash for Animal Collar," filed Jun. 26, 2014, each of which is assigned to the assignee hereof, and expressly incorporated by reference herein.

BACKGROUND

Animals in general and dogs in particular have become part of the family. Animal owners everywhere spend much of their time at home with their pets. But most people also spend a significant amount of time away from home—for work and other commitments—and animal owners simply cannot be with their animal companions at all hours of the day. Even the best animal owners have doubts about the quality and quantity of food, exercise, and discipline they give to their animals. An animal owners' sense of helplessness or anxiety may be amplified when long days at the office or extended trips away from home require extended time away from their animals.

The modern, connected world has largely ignored developments for animals. For example, dogs still run away in significant numbers, many never to be reunited with their family. And while mobile apps are ubiquitous, raising and training domestic animals has remained largely unchanged and unconnected despite advances in connectivity. It may therefore be beneficial to leverage the increasingly connected world, and the ready flow of information, to foster human-animal relationships and aid owners in meeting their animals' needs while owners manage other commitments.

SUMMARY

Methods, systems, and devices for acquiring data from and communicating with a wearable device (e.g., a collar) affixed to animal are described. Data may be acquired from the wearable device and reported to other mobile devices or servers. The acquired data may be used for monitoring and communicating with an animal by, for example, generating reports, developing training or feeding schedules, or conveying relevant information to animal owners. Data, including user commands, may be transmitted to the wearable device to facilitate real-time interaction with an animal.

A method for animal monitoring and communication is described. The method may include acquiring data for an animal using a wearable device affixed to the animal. The data may include biometric information, location information, movement information, sound information, or the like. The method may also include transmitting the acquired data from the wearable device through a wireless communication system, which may be a cellular network, a wireless local area network, or a wireless personal area network.

An apparatus for animal monitoring and communication is also described. The apparatus may include an animal collar and a controller affixed to the animal collar. The controller may include a processor and memory in electronic communication with the processor. The memory, in turn, may store instructions that when executed by the processor, cause the controller to acquire data for an animal wearing the collar, and transmit the acquired data from the controller through a wireless communication system, which may be a cellular network, a wireless local area network, or a wireless personal area network. The data may include biometric information, location information, movement information, sound information, or the like.

A further apparatus for animal monitoring and communication is also described. The apparatus may include a controller affixed to an animal collar. The controller may include a multi-axis accelerometer to recognize motion of the animal wearing the animal collar, a vibrator to transmit vibrations to the animal wearing the animal collar, and a plurality of transceivers to transmit data acquired by the controller through a wireless communication system; each transceiver of the plurality may employ a different radio access technology. The apparatus may also include a microphone affixed to the animal collar and in electronic communication with the controller to receive sounds from an animal wearing the animal collar, a speaker affixed to the animal collar and in electronic communication with the controller to transmit sounds to the animal wearing the animal collar, a luminaire affixed to the animal collar and in electronic communication with the controller to transmit light in the proximity of the animal wearing the animal collar, an energy store affixed to the animal collar and in electronic communication with controller, and a leash connector affixed to the animal collar.

Further scope of the applicability of the described methods, systems, and devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
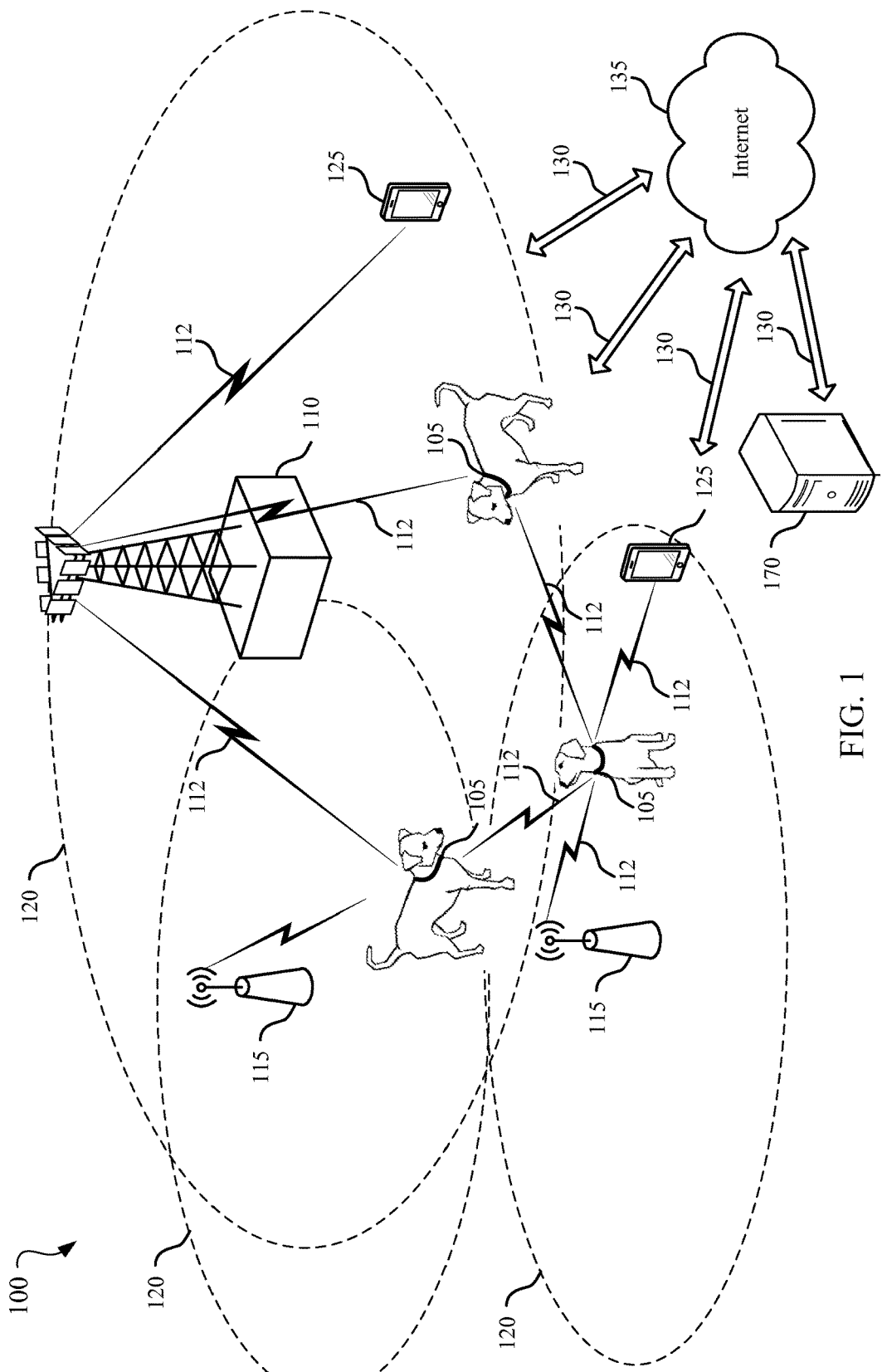
FIG. 1 illustrates an example system that supports data acquisition, reporting, and feedback with an animal collar in accordance with various aspects of the present disclosure.

An animal collar (or other wearable device) may gather and report data about an animal—a dog or cat, for example. The device may gather data related to geographic location, relative location, movement, biometry, noise-making (e.g., barking, whining, etc.), information from other devices, and the like. For example, a collar affixed to a dog may track and report an animal's geographic coordinates, pace, position relative to other objects, vital signs, energy usage, and the like. The device may report data to a server (e.g., via a cellular or WLAN link) or to a mobile device (e.g., via a wireless personal area network (WPAN)), or both. This reporting may be in real time, at defined intervals, according to a triggering event, or on demand.

In some cases, the device may also facilitate two-way communication (e.g., via a microphone and speaker) between an animal wearing the animal collar and the animal's caretaker. In some examples, the collar (or other wearable device) is an aspect of a "connected home." In other examples, the collar may wirelessly communicate with other wearable devices associated with (e.g., worn by) other animals. In some cases, the collar (or other wearable device) provides triggered responses according to user specifications. A mobile device (e.g., a smartphone or tablet) or a server may receive data from multiple wearable devices, from third-party servers, or from a variety of users (e.g., human input), all of which may be used to deliver user-specific content to the collar while being worn by an animal. Wearable devices may also communicate with other mobile devices allowing a user to supervise and control an animal wearing the device.

The present disclosure provides examples, and is not intended to limit the scope, applicability, or configuration of the invention. Rather, this description will provide those skilled in the art with an enabling description for implementing embodiments of the invention. Various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following methods, systems, devices, and software may individually or collectively be components of a larger system, wherein other procedures may take precedence over or otherwise modify their application. The following discussion is generally given in terms of dogs, but those skilled in the art will recognize that the described tools and techniques will apply to other animals and, in some cases, to children or other people who require supervision. Likewise, the discussion regarding wearable devices is generally framed in terms of a dog collar, but the described tools and techniques may apply to any wearable electronic device, including jewelry, headwear, footwear, clothing, and the like.

Referring first to FIG. 1, shown is a system 100 configured for data acquisition, reporting, and feedback using wearable devices 105 affixed to an animal. The system may include cellular base stations 110 and wireless access points (APs) 115 with communication links 112 to devices within wireless coverage areas 120. The base stations 110 or APs 115 may be in communication with wearable devices 105 and mobile devices 125. Each of the base stations 110 and APs 115 may have communication links 130 (e.g., backhaul connections with a core network) with the Internet 135. In various examples, the communication links 130 may be wired or wireless backhaul links, which may be routed through one or more core networks operated by service providers associated with the base stations 110 or APs 115.

The base station 110 may be a base station within a cellular network operated by a licensed-spectrum service provider. The base station 110 may communicate according to any number or wireless communication standards—e.g., standards developed and maintained by an organization referred to as the Third Generation Partnership Project (3GPP), the Institute for Electrical and Electronics Engineers (IEEE), or the like. The base station 110 may thus communicate with the wearable devices 105 or the mobile devices 125 utilizing code division multiple access (CDMA), time-division multiple access (TDMA), frequency division multiple access (FDMA), or orthogonal frequency division multiple access (OFDMA). Examples of wireless standards include Long Term Evolution (LTE), Universal Mobile Telecommunication System (UMTS), Global System for Mobile Telecommunications (GSM), General Packet Radio Services (GPRS), CDMA2000, and the like.

The APs 115 may be small cells operated by license-spectrum service providers; or the APs 115 may, in some examples, be WLAN APs 115. For example, the APs 115 may communicate with the wearable devices 105 or mobile devices 125 utilizing technology based on the IEEE 802.11 family of standards ("WiFi"). In some examples, the APs 115 may also be configured to communicate utilizing Bluetooth and or a protocol based on the IEEE 802.15 family of standards ("ZigBee").

The wearable devices 105 may be equipped with one or several radios so the devices 105 are configured to communicate with base stations 110, APs 115, other wearable devices 105 or mobile devices 125 via communication links 112 utilizing one or more of a cellular communication protocol (e.g., LTE, GSM, or GPRS), a WLAN protocol (e.g., WiFi), and a WPAN protocol (e.g., Bluetooth). As discussed below, the wearable devices 105 may be equipped with various data-acquisition hardware (e.g., an accelerometer, a global positioning system (GPS) receiver, microphone, thermometer, biometric sensors, etc.). The wearable devices 105 may thus acquire data from an animal to which the device 105 is affixed, and the devices 105 may report the acquired data via a wireless communication system—e.g., a wearable device 105 may transmit acquired data via base station 110 utilizing a cellular protocol or via AP 115 utilizing a WLAN protocol. By way of example, the wearable device 105 may report acquired data from or over the Internet 135.

Data may be accessed by or displayed to users (e.g., animal owners or care takers), who may create a user account via a web-interface for accessing the server 170. The server 170 or the mobile devices 125 may employ data analytics to interpret the data and to facilitate relaying the data to the user. For example, information related to an animal's health, location, movement, current activity, companions, and the like, may be gathered by the wearable devices 105 and reported to a user (e.g., via a user interface, the user account, etc.). In some cases, a user may have multiple animals each fitted with wearable devices 105, and the user may receive or access gathered data about each animal.

In various examples, an application residing on the server 170 or mobile device 125, or both, may analyze the received data and develop content or programming for a user. Additionally, the server 170 or the mobile device 125 may access third-party data through the Internet 135, and may incorporate the data into the analysis or user-specific content. For instance, the application may generate feeding schedules, training programs or methods exercise regimens, activity recommendations, recommended outings, and the like, based on data acquired from a wearable device 105 and based on time of day, time or year, current weather, present location, current events, and the like. In some cases, the application may develop and make recommendations by learning from historic data.

The mobile devices 125 may be cellular phones, smartphones, tablet computers, netbooks, Internet-connected computers, or the like. The mobile devices may be configured to communicate utilizing one or several wireless protocols, including the cellular protocols, WLAN protocols, or WPAN protocols discussed above. The mobile devices 125 may be equipped with an application that facilitates communication with one or several wearable devices 105, and which offers a user interface for interacting with the wearable devices 105. A dog owner, for instance, may thus utilize a mobile device 125 to monitor, communicate, and interact with a wearable device 105 affixed to her dog.

In some examples, the wearable devices 105 may receive information from a user through the system 100. For instance, a user may communicate directly with a wearable device 105 utilizing a mobile device 125 (e.g., with Bluetooth), or the user may communicate through an Internet-connected computer 125 and an AP 115 to the wearable device 105. In other examples, a user may communicate through a base station 110 utilizing a cellular data connection of a mobile device 125.

A wearable device 105 may ascertain a global position using a GPS receiver, or it may ascertain a relative position to other wearable 105 or mobile devices 125 using, e.g., WiFi positioning. Additionally or alternatively, a wearable device 105 may determine a rate at which an animal wearing the device 105 is moving, using the accelerometer and WiFi positioning, for instance.

The wearable devices 105 may acquire information and report it to a mobile device 125 or to a server 170 through the Internet. In some examples, the mobile device 125, the server 170, or the wearable device 105 itself may analyze the acquired data to determine various conditions about the animal wearing the device. For instance, information related to health, diet, and exercise may be determined. The mobile device 125 or a server 170 may, for instance, be equipped with an application that allows a user to evaluate the acquired information and learn about the activity of a dog wearing the device 105. In some cases, the wearable device 105 may also acquire and report (e.g., record) sound information. By way of example, an application on a mobile device 105 or on a server 170 may determine that the combination of acquired information is indicative of an emergency situation (e.g., a hurt or lost dog), and it may indicate as much to a user of the system 100. The wearable devices 105 may report data in real time, at user-defined intervals, according to certain triggering events, or at the demand of a user.

Next, FIGS. 2A, 2B, 2C, and 2D show systems 202, 204, 206, and 208 that support data acquisition, reporting, and feedback using wearable devices 105 affixed to an animal. The systems 202, 204, 206, and 208 may be examples of aspects of the system 100 described with reference to FIG. 1. The systems 202, 204, 206, and 208 may include dog collars 105, which may be examples of the wearable devices 105, and which may perform the same or similar functions. The system 202 may further include various elements 210 of a connected home. For instance, the systems 202 and 204 may include a central control panel 210, a connected doggie door 210, or monitoring beacons 210. In some examples, aspects of the system 202 are configured to be part of a connected home by a manufacturer, while in other cases, monitoring beacons 210 may be affixed to aspects of the connected home after market. As used in this disclosure, a connected home is a residence, commercial, or industrial facility having appliances, meters, fixtures, entertainment devices, computers, handheld devices, and the like, configured to communicate with one another or with the Internet, or both. The collars 105 may operate with other networked or wired devices or appliances within the connected home. The collars 105 may, for example, be used for granting or restricting access to various locations; and it may be utilized for training an animal. In some cases, a collar's 105 interactions with other devices may trigger certain signals to be communicated to the dog wearing the collar 105.

The dog collars 105 may communicate directly with elements 210 home over communication links 212. As discussed below, each collar 105 may be equipped with a unique identifier, and the user of the system 202 may for instance, program or otherwise configure connected elements 210 within the home to respond in particular ways in the presence of the collar 105. For instance, a collar 105 may indicate the presence of a dog near a doggie door 210, and the doggie door 210 may unlock or open, or both. Or the doggie door 210 may lock in the presence of the collar 105. The doggie door 210 may thus limit, restrict, or allow access (in either direction) to dogs wearing collars 105 with necessary access credentials.

In some examples, the central control panel 210 may adjust operations of a connected home based on the presence of collars 105. For instance, the central control panel 210 may adjust temperature, lighting, door locks, etc. based on whether and which collars 105 (and by implication, which dogs) are present in the connected home. A collar 105 may communicate with the central control panel via a communication link 212. In some cases, the collar 105 may communicate directly with the central control panel 210, e.g., via Bluetooth.

Additionally or alternatively, elements 210 of the connected home may communicate with a home network (e.g., a home WiFi network or a home base station), and the dog collar may communicate with elements 210 of the connected home through the home network. In some cases, WiFi positioning (e.g., WiFi location tracking) procedures may be implemented to determine a location of a dog collar 105 (and by implication, a dog wearing the collar) within the system 202. For instance, WiFi positioning procedures may be employed to determine that a dog collar 105 is within a certain proximity or designated distance 220 of a piece of furniture within the system 202. Based on this determination, the collar 105 may implement pre-defined training or warning techniques.

For instance, a collar 105 may acquire real time information indicative of a dog's behavior, and collar 105 may trigger behavior-reinforcing or behavior discouraging feedback based on the acquired data. The collar 105 may be configured to emit sounds, scents, electric/electronic signals, mechanical feedback, and the like. For example, the collar 105 may be within a designated distance 220 of piece of furniture. The collar 105 may be configured to dissuade a dog from jumping onto furniture. Thus, the collar 105 may acquire data related to the dog's movement, which may be indicative of the dog climbing or jumping onto furniture. For instance, if the collar 105 is within the designated distance 220 and the accelerometer indicates a sudden upward motion, the collar 105 may determine that the dog wearing the collar 105 is attempting to jump onto, e.g., a couch. The collar 105 may thus respond with a discouraging sound, vibration, or the like. In some examples, the collar 105 may include diffuser or deodorizer that is electronically controlled to emit a scent on receiving a control signal from a controller.

Figure 2A:
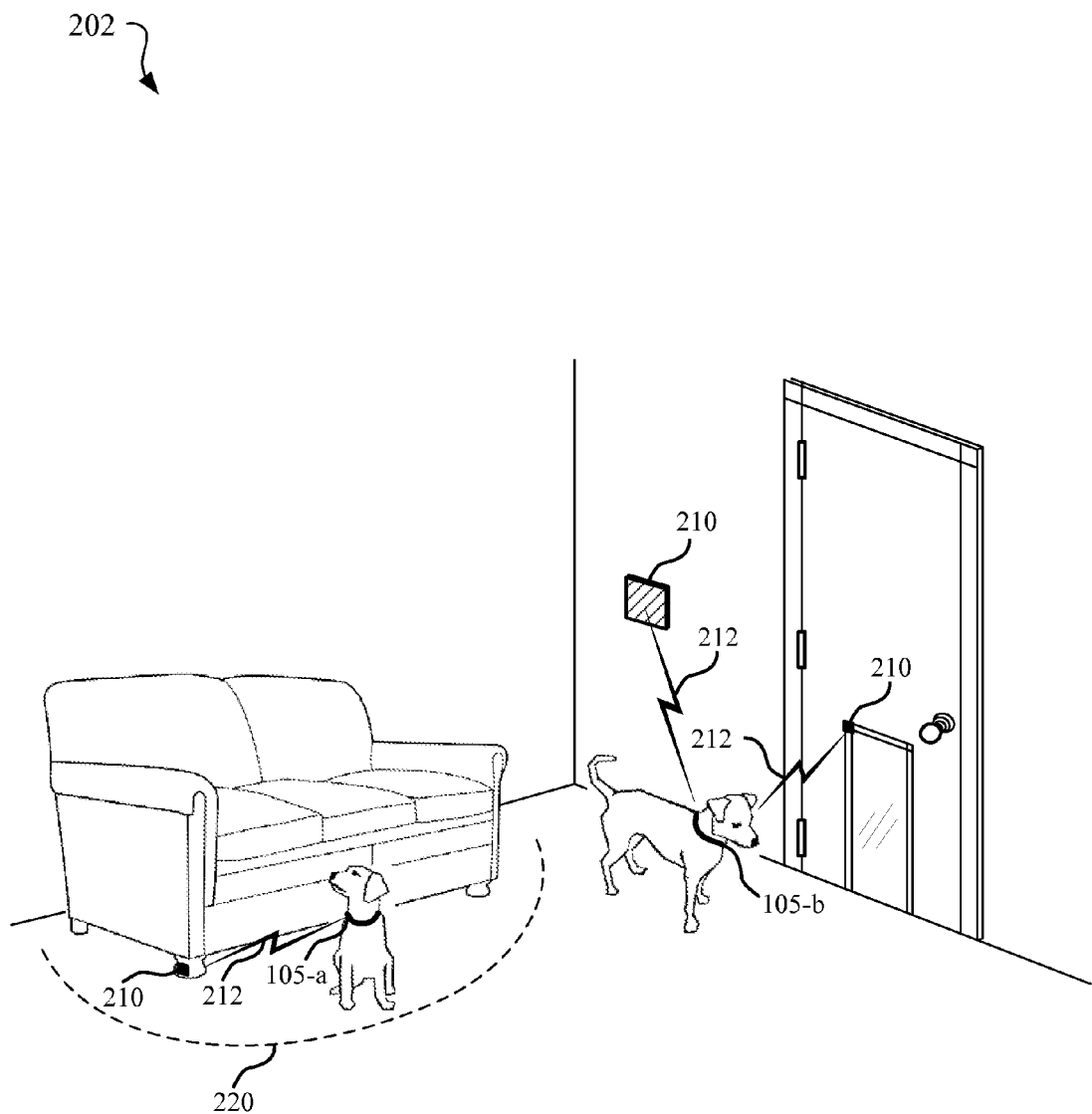
FIGS. 2A-2D illustrate an example system or systems that support data acquisition, reporting, and feedback with an animal collar in accordance with various aspects of the present disclosure.
Figure 2B:
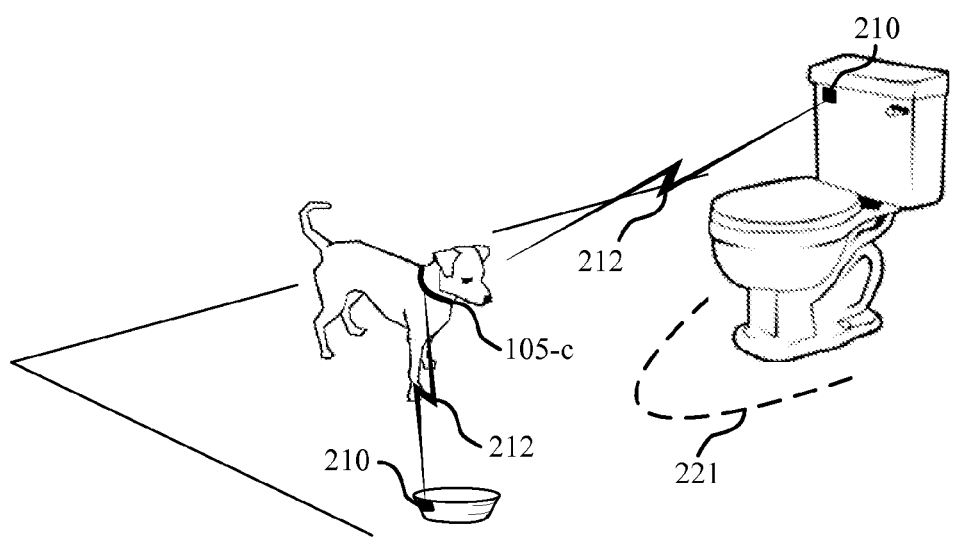

In other examples, such as that illustrated in FIG. 2B, a collar 105 may acquire data related to an animal's behavior that a user seeks to reinforce. For instance, as shown in FIG. 2B, a dog may be faced with a choice of drinking from a toilet or a designated water bowl. Each may be equipped with a beacon 210, and the location of each within the connected home may be known to a user. Additionally or alternatively, a proximity of a collar 105 with respect to the toilet and bowl may be known. As with the furniture example discussed with reference to FIG. 2A, the collar 105 may be configured to give a dog behavior-altering feedback if the dog ventures within the area 221 near a toilet. But the collar 105 may be configured to give the dog positive feedback (e.g., emit positive sounds) as the collar moves away from the toilet and nearer the dog bowl.

Other preferred behavior may be similarly rewarded. For instance, positive interactions with other animals within a home, may cause the collar 105 to emit an encouraging sound. As discussed below, the collar may also be programmed to implement various training methodologies or to achieve various goals as expressed by a user (e.g., an animal owner).

Figure 2C:
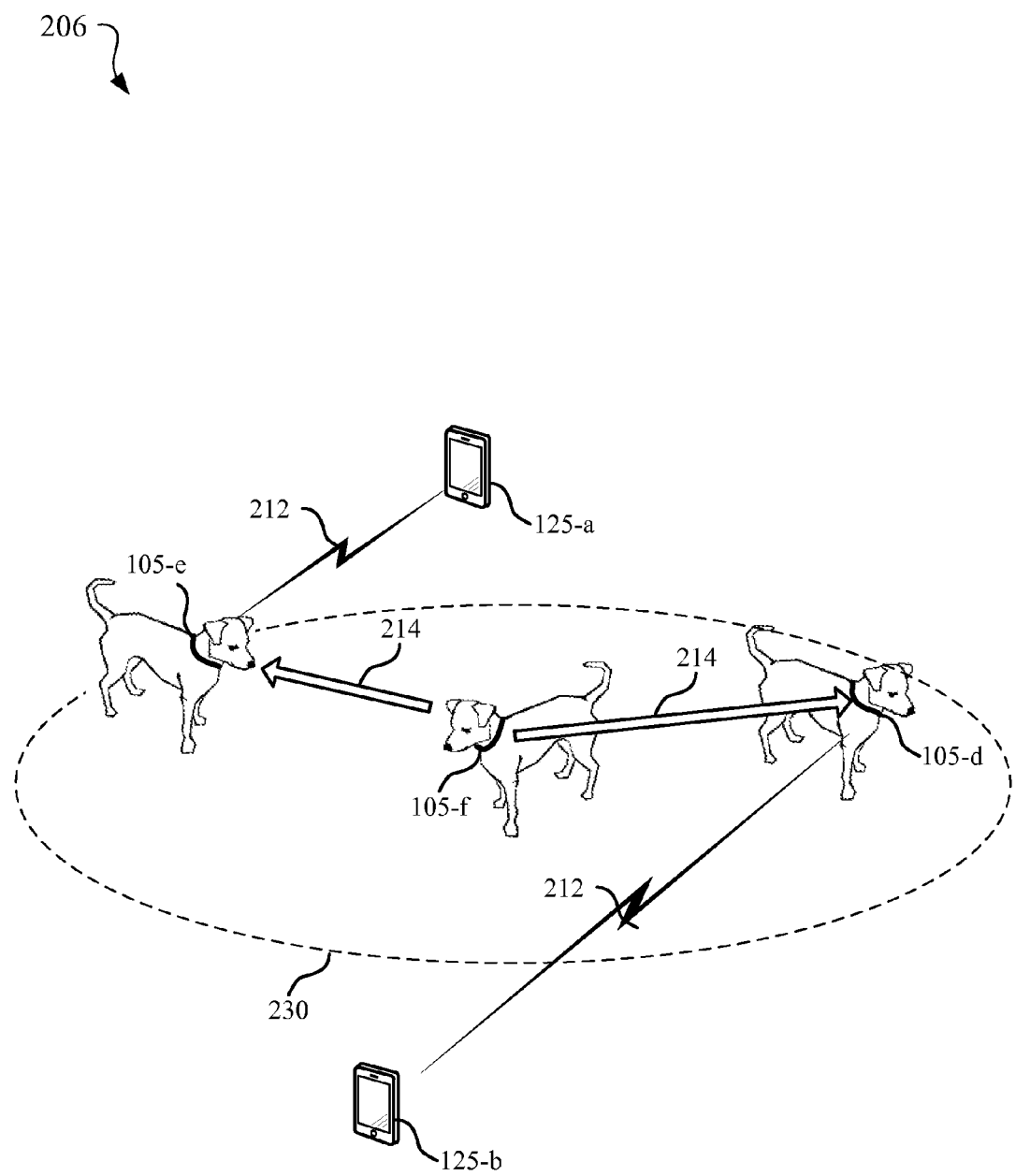

The system 206 of FIG. 2C may include collars 105 and mobile devices 125, which may be examples of corresponding devices described in the preceding figures. Within the system 206, collars 105 affixed to different animals may communicate with one another, and those signals may be relayed to mobile devices 125 through communication links 212. For example, collars 105 within a certain area 230 of another collar 105 may be broadcast information in cellular signal 214, for example, which may be relayed over communication links 212, and which may allow users (e.g., dog owners or caretakers) to take appropriate action.

By way of example, collars 105 affixed to dogs at a dog park may communicate with one another. One dog may, for example, have a history of aggression, and his collar 105-*f* may broadcast a signal 214 with information indicative of his aggressive nature. Other collars 105 may receive this broadcast and relay the information to mobile devices 125-*a* and 125-*b* of their respective owners' mobile devices 125 through communication links 212 (e.g., via Bluetooth). The owners receiving the information may thus receive a notification and take appropriate action to remove their dog from the area.

Alternatively, the collars 105 may facilitate play between dogs. For example, the collars 105 may receive signals from one another indicative of the unique identifier associated with each collar 105. The signal 214 may be thus indicate that a known collar 105, which may be associated with a "friend," is in the area, and the communication link 212 may relay that information to the mobile device 125. A dog owner may thus be apprised that her dog's friend is in the vicinity without first seeing the friend.

Figure 2D:
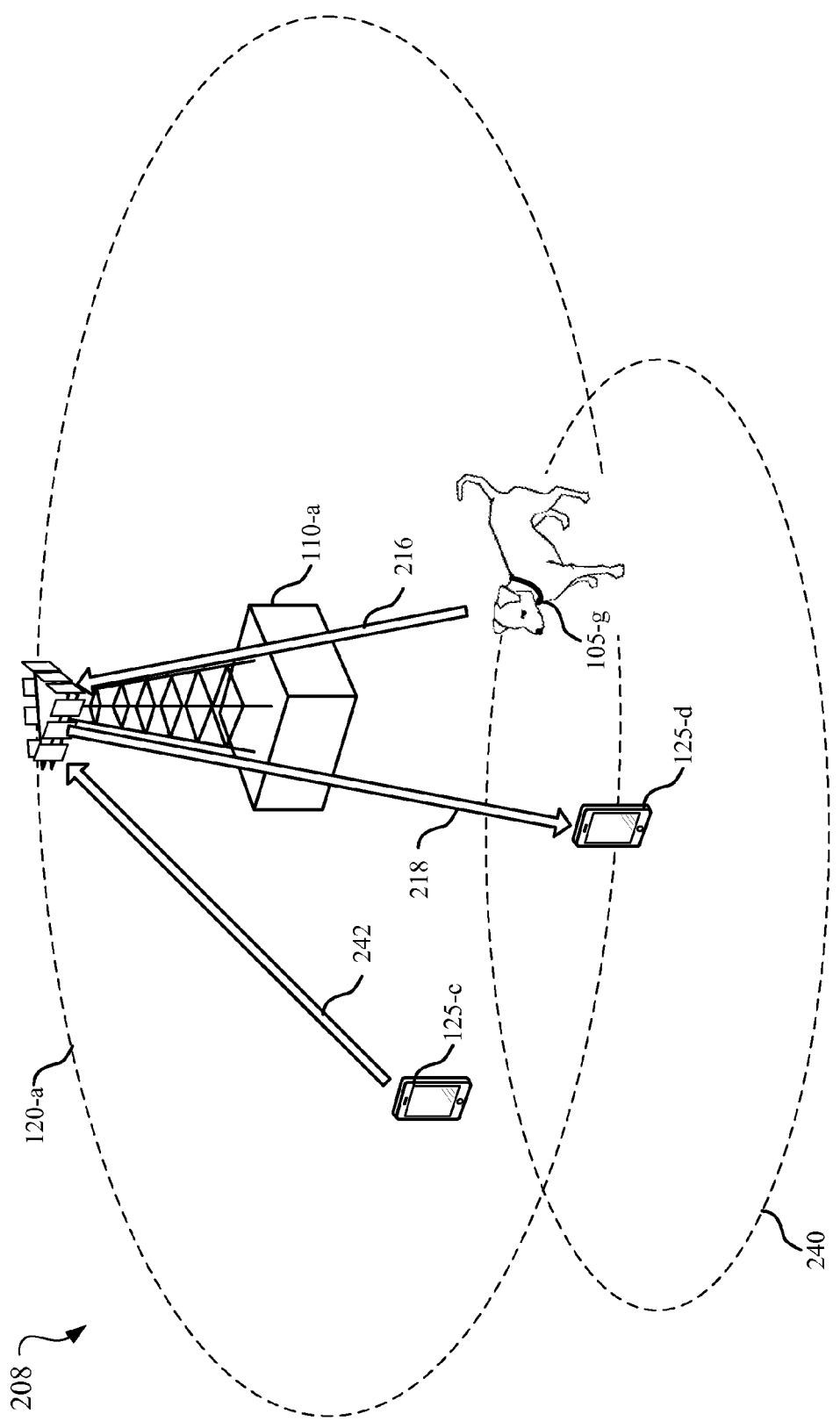

The system 208 of FIG. 2D may include collars 105, a base station 110, and mobile devices 125, which may be examples of corresponding devices described in the preceding figures. The system 206 may illustrate communications involving a mobile device 125-*c* associated with the owner of one animal, and a collar 105-*g* affixed to a different animal owned by someone else and not associated with the mobile device 125-*c*. In some examples, the base station 110 may transmit information about a collar 105 to a mobile device 125 associated with a different collar 105, if the information is relevant to or requested by the mobile device 125.

For example, dog owners and users of collars 105 may subscribe to a network-based service. The users may opt to be notified of missing dogs, e.g., dogs fitted with collars 105. If one user reports his dog missing, system 208, through base station 110 may monitor transmissions 216 from the collar 105-*g*, or the system 208 may monitor other indicia of location of the collar 105-*g* (e.g., GPS data). The system 208, through base station 110, may then transmit a notification signal 218 to mobile devices 125 within the coverage area 120 of the base station 110. In some cases, the base station 110 may only transmit signals 218 related to the missing dog if collar 105-*g* is within a certain area 240 (e.g., a one mile radius) of the mobile device 125-*d*.

In some cases, and in a similar manner, multiple users of the system 208 may communicate location specific information to one another. For example, a user may identify a particular danger, which may be relevant to dogs (e.g., a mountain lion) and may send a message 242 related to danger. If another user enters the area, the system 208 through base station 110 may transmit a warning signal 218. The system 206 may, for instance, transmit a signal 218 if the warning message is within the area 240 of the user's mobile device 125-d.

Figure 3:
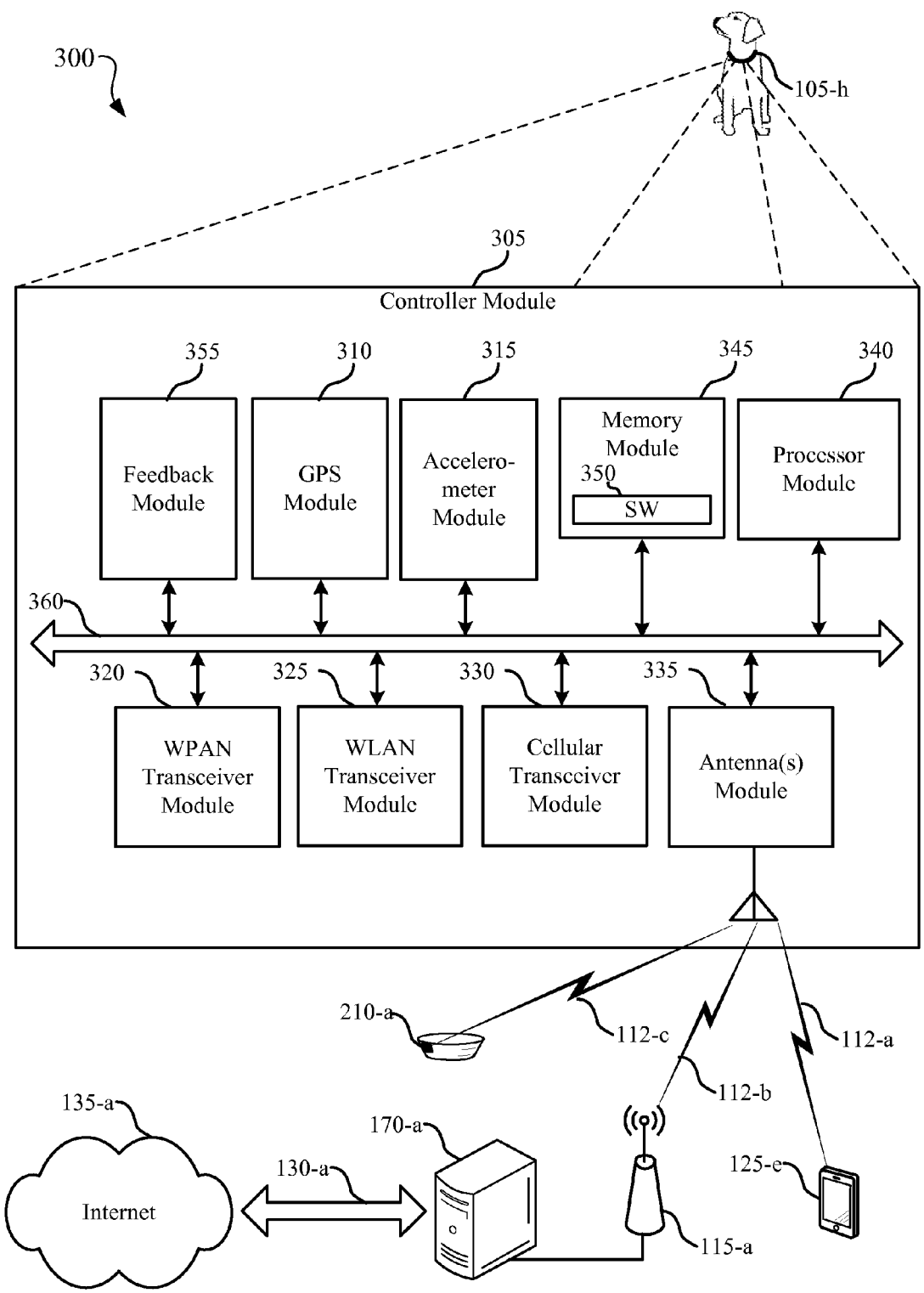
FIG. 3 illustrates an example system, including an animal collar and controller, that supports data acquisition, reporting, and feedback with an animal collar in accordance with various aspects of the present disclosure.

FIG. 3 shows a system 300 that supports data acquisition, reporting, and feedback. The system 300 may include a collar 105-h, which may be in a communication with a mobile device 125-a, an AP 115-a, or a beacon 210-a via communication links 112. Each of these components may be examples of the corresponding aspects of systems 100, 202, 204, 206, and 208 described with reference to the preceding figures.

The collar 105-h may be configured with a controller module 305, which may be referred to as a controller, and which, in turn, may include a GPS module 310, an accelerometer module 315, a WPAN transceiver module 320, a WLAN transceiver module 325, a cellular transceiver module 330, an antenna module 335 a processor module, a memory module 345 (including software (SW) 350), and a feedback module 355. Each of these various modules may be in communication with one another, e.g., through one or more buses 360. The collar 105-h may also be configured with an energy storage device (e.g., an energy store) (not shown), which may be in electrical communication with, and may provide power to various components of the collar 105-h. For instance, the collar 105-h may be configured with one or more rechargeable batteries (e.g., Li-ion, NiMH, etc.), alkaline batteries, supercapacitors, ultracapacitors, or the like. Additionally or alternatively, the collar 105-h may be configured with electrodes (e.g., conductive arrays) for gathering biometric information of an animal wearing the collar 105-h. For instance, the collar 105-h may be configured to gather heart-rate, temperature, perspiration, or other biometric indicators of the animal.

The accelerometer module 315 may include one or several single or multi-axis accelerometers. In some examples, the accelerometer module 315 includes a nine-axis accelerometer. The accelerometer module 315 may include accelerometers that measure proper acceleration or coordinate acceleration, in various embodiments. The accelerometer module 315 may include micro electro-mechanical systems (MEMS), or the accelerometer module 315 may include a transducer of any type known in the art for converting mechanical inputs into electrical signals, which may be used to communicate with other modules of the controller module 305. In some examples, the accelerometer module 315 is configured (e.g., calibrated) to monitor the motion or orientation of the controller module 305, and thus the collar 105-h. The processor module 340 may thus utilize inputs indicative of motion or orientation, or both, to perform various operations.

The GPS module 310 may be or include a GPS receiver employing autonomous or assisted GPS (AGPS). In some examples, the GPS module 310 may thus communicate with and utilize satellite-based radio signal for determining a location, without the necessity of additional network signaling. In other examples, the GPS module 310 may utilize a GPS receiver that leverages a network connection (e.g., communication link 130-a) with the internet 135-a through an AP 115-a or a base station 110 (FIG. 1). The GPS module 310 may be configured to determine a location of the controller module 305, which may also be referred to as a controller, and thus the collar 105-h, on demand, in real time, or at defined intervals; and the GPS module 310 may communicate the determined location (e.g., latitudinal and longitudinal coordinates) to the processor module 340. In some examples, the GPS module 310, in combination with other modules of the controller module 305, is configured to communicate a real time location of the collar 105-h to the mobile device 125-a. A user of the mobile device 125-a may thus utilize an application (e.g., a navigation or map-based application) that visually indicates a position of the collar 105-h (e.g., on a map).

The controller module 305 may include components for bi-directional voice and data communications, including components for transmitting communications and components for receiving communications. For example, the controller module 305, and thus the collar 105-h, may communicate with APs 115, beacons 210, and other collars 105. Each of the transceiver modules 320, 325, and 330 may be configured to communicate bi-directionally, via the antenna(s) module 335 or one or more wired or wireless links, with one or more networks, as described above. For instance, each of the transceiver modules 320, 325, and 330 may include a modem configured to modulate packets and provide the modulated packets to the antennas via the antenna(s) module 335 for transmission; and the modems may be configured to demodulate packets received from the antennas via the antenna(s) module 335. The controller module 305 (or the collar 105-h more generally) may include one or several antennas capable of concurrently transmitting or receiving different wireless communications. The controller module 305 may be configured to concurrently communicate with cellular networks, WLANs, WPANs, or the like utilizing one or more of the communications protocols described above.

In some examples, the controller module 305 may acquire data from an animal wearing the collar 105-h, and the controller module 305 may report the acquired data to a server 170-a or via the Internet 135-a. The reported data may be stored, analyzed, or utilized to develop various training programs or feedback to be implemented via the collar 105-h.

The memory module 345 may include random access memory (RAM) or read-only memory (ROM), or both. The memory module 345 may store computer-readable, computer-executable software/firmware code 350 containing instructions that are configured to, when executed, cause the processor module 340 to perform various functions described herein (e.g., acquiring data, reporting data, implementing training programs, etc.). In other examples, the software/firmware 350 is not directly executable by the processor module 340, but is configured to cause a computer (e.g., when compiled and executed) to perform the functions described herein. The processor module 340 may include an intelligent hardware device, e.g., a central processing unit (CPU), a microcontroller, an application-specific integrated circuit (ASIC), or the like.

In some examples, the SW code 350 includes processor-executable instructions for the processor to implement various training methodologies, e.g., for a dog wearing the collar 105-h. The processor module 340, in conjunction with the feedback module 355 and various data acquisition modules (GPS, accelerometer, transceiver, etc.) may provide behavior-modifying or behavior-reinforcing feedback to the dog wearing the collar 105-h according to a specific methodology. A user (e.g., a pet owner or trainer) may load SW code 350 including one or several methodologies into the memory module 345. For instance, a user may wirelessly transmit data with the relevant SW code 350 from a mobile device 125-*a* to the controller module 305. In other examples, SW code 350 with various methodologies may be downloaded via an AP 115-*a*, and the Internet 135-*a* through a link 130-*a* to a server 170-*a*.

The feedback module 355 may be configured to provide audible, visual, or mechanical feedback to an animal wearing the collar 105-*h*. For instance, the feedback module 355, in conjunction with the processor module 340, may provide feedback to a dog (e.g., sounds, vibration, etc.) to encourage or discourage behavior, as discussed above with reference to FIGS. 2A and 2B.

Figure 4:
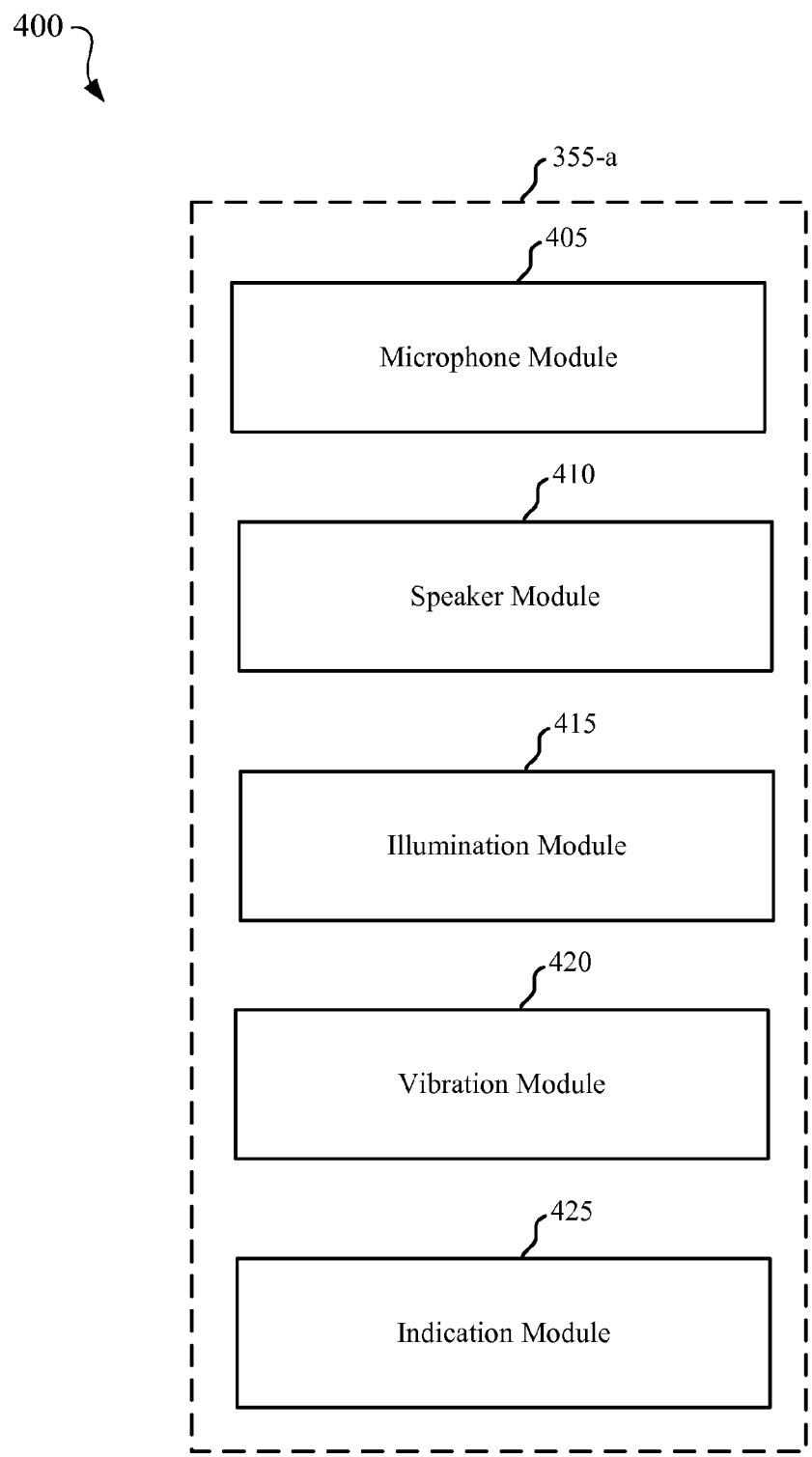
FIG. 4 illustrates an example feedback module that supports data acquisition, reporting, and feedback with an animal collar in accordance with various aspects of the present disclosure.

FIG. 4, shows a block diagram 400 of an example feedback module 355-*a* configured to provide feedback to animal wearing a wearable device 105. The feedback module 355-*a* may thus be a component of a system that supports data acquisition, reporting, and feedback as described herein. The feedback module 355-*a* may include a microphone module 405, a speaker module 410, an illumination module 415, a vibration module 420, or an indication module 425, or various combinations of such modules. While the block diagram 400 depicts collocated submodules of the feedback module 355-*a*, those skilled in the art will recognize that other arrangements of the modules and submodules are possible. In some instances, submodules of the feedback module 355-*a* may be located on different portions of the collar 105-*h*. For instance, input devices (e.g., microphones) may be located to accentuate signal reception, while output devices (e.g., vibrators, speakers, etc.) may be located to accentuate signal communication to an animal wearing the collar 105-*h*.

The microphone module 405 may be configured with one or several microphones. In some examples, several microphones are configured about the collar 105-*h*—some configured to receive sounds (e.g., barking, whining, etc.) from the animal wearing the collar 105-*h*, and some configured to receive sounds (e.g., traffic noise, other animals, etc.) from sources remote from the collar 105-*h*. Components of the controller module 305 (FIG. 3) may use signals received by the microphone module to generate and report data; and the controller module 305 may use these signals to generate feedback for an animal wearing the collar 105-*h*.

The speaker module 410 may be configured with one or several speakers, which may be configured to transmit sounds of different or varying frequencies. In some cases, the speaker module 410 may be configured to emit sounds at a frequency audible only to certain animals (e.g., dogs), while in other examples, the speaker module 410 may include wideband speakers configured to emit sounds across the spectrum audible to humans. Components of the controller module 305 may utilize the speaker module 410 to provide feedback—for example, as an aspect of a sound-based dog training methodology, such as "clicker-training," or a variant thereof. In some examples, the speaker module 410 may be configured to allow a user of the mobile device 125-*c* (FIG. 3) to audibly communicate with an animal wearing the collar 105-*h*. For instance, the user may speak a command into the mobile device 125-*c* as though the user were engaging in a telephone call, and the command may be relayed to the speaker module 410 via aspects of the system 300 and the controller module 305.

In some examples, the illumination module 415 is configured to illuminate a path of an animal wearing the wearable device 105-*h*. The illumination module 415 may thus be configured with luminaires (e.g., light emitting diodes (LEDs)) arranged to light the ground around, e.g., a dog. Additionally or alternatively, the illumination module 415 may be configured with luminaires arranged to draw attention to the collar 105-*h*. For example, LEDs may be arranged about the circumference of a collar, which may increase visibility of a dog wearing the collar. In some examples, the illumination module 415 may be remotely controlled such that luminaires may be activated or deactivated by, e.g., an application of a mobile device 125-*c*. In some cases, the illumination module 415 may be configured with a photo-voltaic switch (e.g., a photocell), which may activate and deactivate luminaires according to ambient lighting conditions. In some cases, modules of the controller module 305 may utilize the illumination module 415 to provide visual feedback to an animal wearing the collar 105-*h*.

The vibration module 420 may be configured to vibrate the controller module 305 or the collar 105-*h*. The vibration module 420 may be, or may include, an electric motor connected to a weight, which may be configured to facilitate vibration. The vibration module 420 may thus be configured with any motor known in the art for providing a vibrating alert. Modules of the controller module 305 may utilize the vibration module to provide mechanical feedback to the an animal wearing the collar 105-*h*. In some examples, the vibration module may be referred to as a vibrator.

The indication module 425 may be configured to indicate to a user (e.g., an animal owner or caretaker) a status of one or more aspects of the controller module 305. The indication module 425 may include LEDs, a liquid crystal display (LCD), a sound emitting device, or the like. The indication module may thus indicate a low battery (or low energy store) state, a network connection problem, a failed device, or the like.

Figure 5:
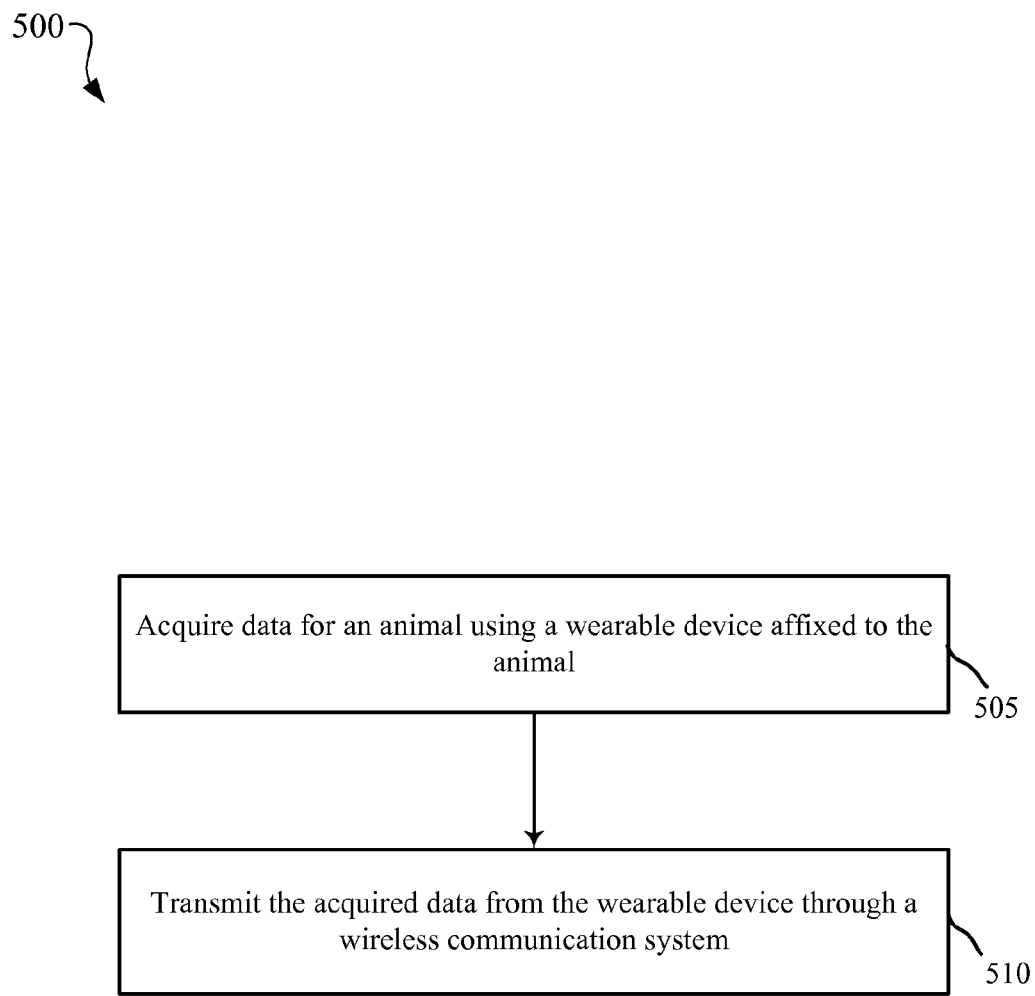
FIGS. 5-7 illustrate example methods of data acquisition, reporting, and feedback with an animal collar in accordance with various aspects of the present disclosure.

Turning next to FIG. 5, a flow chart illustrates a method 500 for acquiring and reporting data from an animal utilizing a wearable device. The method 500 may be implemented by various components or modules of the wearable devices (e.g., collars) 105 described with reference to the preceding figures.

At block 505, the method 500 may include acquiring data from an animal using a wearable device affixed to the animal. The data may include biometric information, location information, movement information, sound information and the like. The features of block 505 may, in some cases, be performed by the GPS module 310, the accelerometer module 315, one or more of the transceiver modules 320-330, or a biometric electrode of the wearable device 105-*h* of FIG. 3.

At block 510, the method may include transmitting the acquired data from the wearable device through a wireless communication system. The wireless communication system may be a cellular network, WLAN, WPAN, or the like, as discussed herein. In various examples, the feature of block 510 may be performed by one or more of the transceiver modules 320-330 or the antenna(s) module 335 of FIG. 3.

Figure 6:
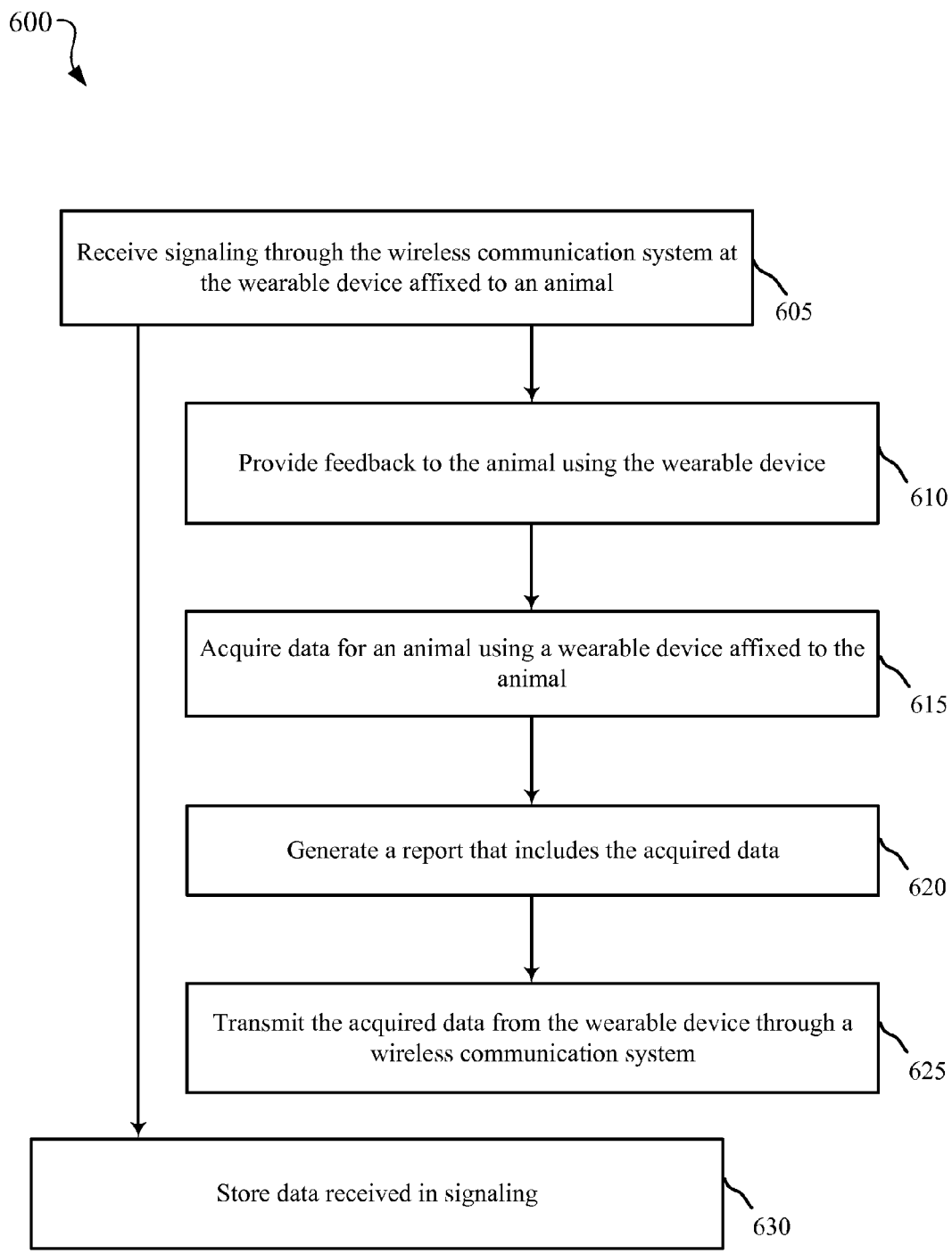

In FIG. 6, a flow chart illustrates a method 600 for acquiring and reporting data from an animal utilizing a wearable device. The method 600 may be implemented by various components or modules of the wearable devices 105 described with reference to the preceding figures.

At block 605, the method 600 may include receiving signaling through a wireless communication system at the wearable device affixed to an animal. The signaling may be sent from a mobile device and may include a user command represented by an input into the mobile device. The features of block 605 may be performed by one or more of the transceiver modules 320-330 or the antenna(s) module 335 of FIG. 3.

At block 610, the method may involve providing feedback to the animal based at least in part on the received signal. The features of block 610 may be performed by the feedback module 355 of FIG. 3.

At block 615, the method may include acquiring data from an animal using a wearable device affixed to the animal. The data may include biometric information, location information, movement information, or sound information. The features of block 615 may, in some cases, be performed by the GPS module 310, the accelerometer module 315, one or more of the transceiver modules 320-330, or a biometric electrode of the wearable device 105-*a* of FIG. 3.

At block 620, the method may involve generating a report that includes the acquired data and information related to the received data. The report may be generated concurrently with data acquisition, at defined intervals, according to a triggering event, or on demand of a user. The report may include data or a file, which may be used by an application on a mobile device, a server, or the like. In some examples, the report is data representative of a spreadsheet and includes values (e.g., numerical values) for each piece of data acquired from an animal wearing the device. The features of block 610 may be performed by the processor module 340 of FIG. 3.

At block 625, the method may include transmitting the acquired data from the wearable device through a wireless communication system. The report may be sent (e.g., transmitted) based on a triggering event. A triggering event may include a particular value exceeding a threshold. By way of example, if a wearable device determines that an animal has been motionless for a threshold time period, a report may be generated and transmitted to a mobile device. The features of block 625 may be performed by one or more of the transceiver modules 320-330 or the antenna(s) module 335 of FIG. 3.

At block 630, the method may include storing information received in signaling. For example, the signaling may include data representative of a training regimen, and data representative of the data may be stored in memory. The features of block 625 may be performed by one or more of the transceiver modules 320-330 or the antenna(s) module 335 of FIG. 3.

Figure 7:
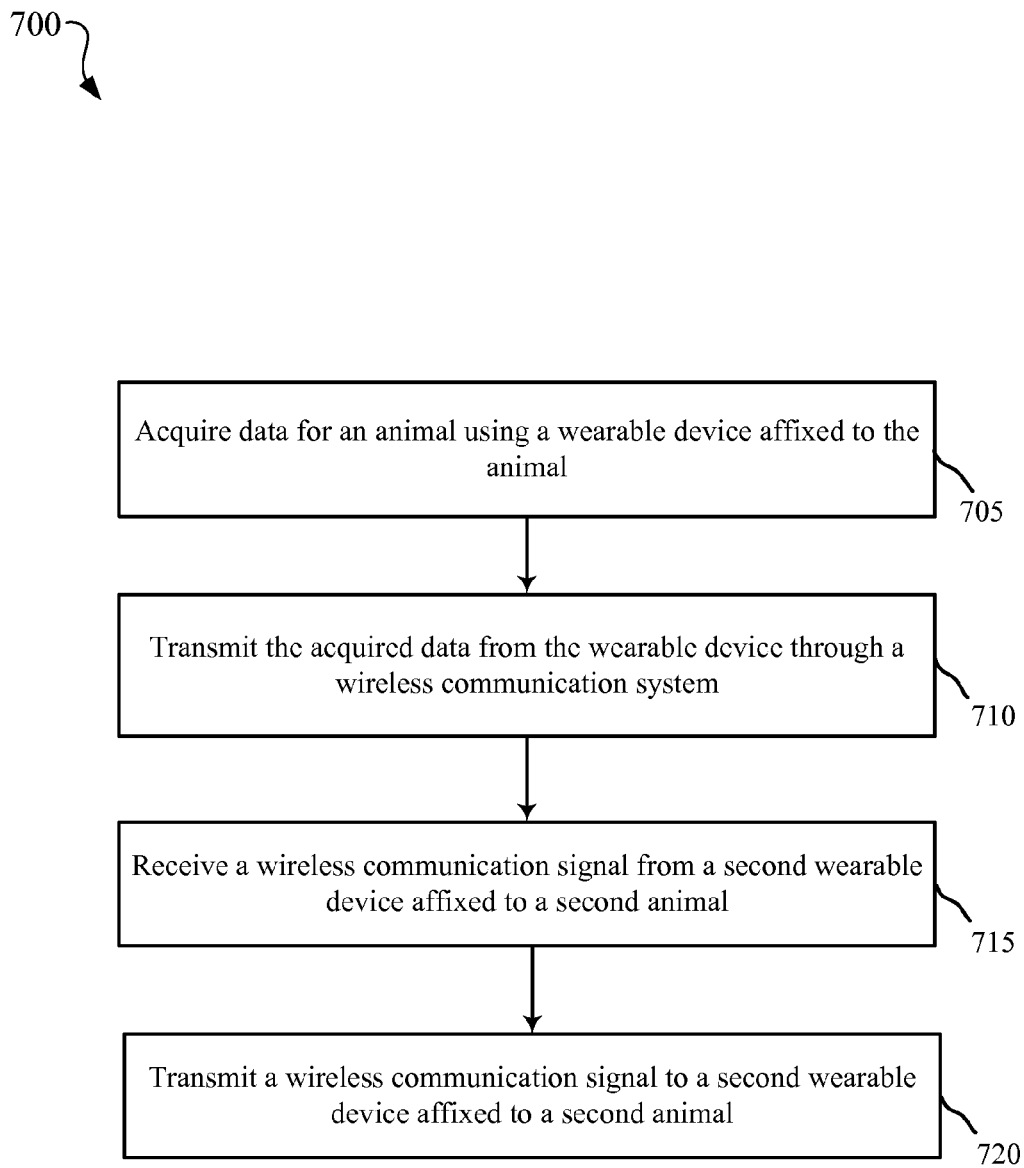

Next, in FIG. 7, a flow chart illustrates a method 700 for acquiring and reporting data from an animal utilizing a wearable device. The method 700 may be implemented by various components or modules of the wearable devices 105 described with reference to the preceding figures.

At block 705, the method 700 may include acquiring data for an animal utilizing a wearable device affixed to the animal. The data may include biometric information, location information, movement information, or sound information. The features of block 705 may, in some cases, be performed by the GPS module 310, the accelerometer module 315, one or more of the transceiver modules 320-330, or a biometric electrode of the collar 105-*h* of FIG. 3.

At block 710, the method may include transmitting the acquired data from the wearable device through a wireless communication system. The wireless communication system may be a cellular network, WLAN, WPAN, or the like, as discussed herein. The features of block 710 may be performed by the feedback module 355 of FIG. 3.

At block 715, the method may include receiving a wireless communication signal from a second wearable device affixed to a second animal. The data acquired by the wearable device may include information received from the second wearable device—e.g., a location or identifier of the second wearable device. The features of block 715 may be performed by the feedback module 355 or one or more of the transceiver modules 320-330 of FIG. 3.

At block 720, the method may include transmitting a wireless communication signal from a second wearable device affixed to a second animal. In some cases, signals are transmitted to the second wearable device based on data acquired by the wearable device at block 705. The features of block 720 may be performed by the feedback module 355 or one or more of the transceiver modules 320-330 of FIG. 3.

Figure 8:
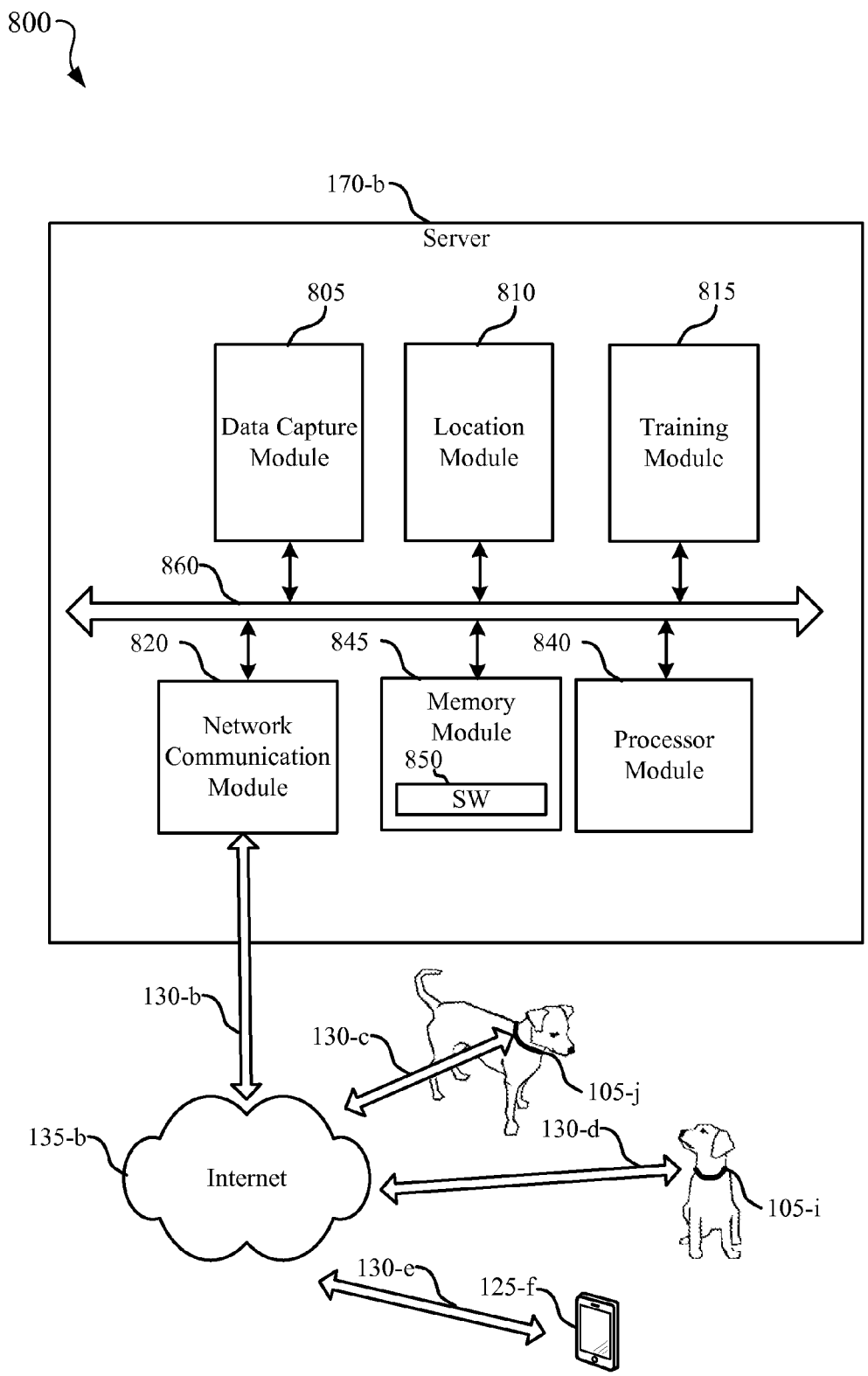
FIG. 8 illustrates an example system, including server, that supports data acquisition, reporting, and feedback with an animal collar in accordance with various aspects of the present disclosure.

Turning next to FIG. 8, shown is a system 800 configured for data analytics and programming utilizing data acquired from wearable devices 105 affixed to animals. The system 800 may include wearable devices 105 in communication through communication links 130 and the Internet 135-*b* with a server 170-*a*. Each of these components may be examples of the corresponding aspects of systems 100, 202, 204, 206, and 208 described with reference to the preceding figures.

The server 170-*b* may include a data capture module 805, a location module 810, a training module 815, a network communication module 820, a memory module 845 (including software (SW) 850), or a processor module. Each of these modules may be in communication with one another via one or more buses 860.

Network communication module 820 may be configured to receive data from the wearable devices 105 and the mobile device 125 via the internet. For example, the network communication module 820 may include a modem configured to modulate packets and transmit the modulated packets, via wired or wireless connections, via a communication link 130 with the internet; and the modem may be configured to demodulate packets received via the communication link 130. The network communication module 820 may be configured with radios or modems for a variety of communication protocols or radio access technologies, including, e.g., those described above with reference to FIG. 1. The network communication module 820, in conjunction with the processor module 840, may route data or signals to other modules within the server 170-*b*.

The data capture module 805 may be configured to receive data sent from the wearable devices 105 and the wireless device 125. In some examples, the data capture module is configured to request and receive, categorize, and analyze data from third-party servers provided via the internet 135. The data capture module 805 may also be configured to generate user content or programming, to maintain user accounts, and to provide a user interface to the server 170-*b*.

In some examples, the data capture module 805 may be configured to host accounts for users, and to store an association of mobile devices 125 and wearable devices 105. For instance, a user may access the server 170-*b*, and thus the data capture module 805, utilizing an application on the mobile device 125. The user may create an account via the application, and the may thus register a unique identifier of his mobile device 125 (e.g., a MAC address). The user may subsequently be prompted to enter an identifier of the wearable device 105, or to otherwise identify a wearable device 105 the user seeks to associate with his mobile device 125. The data capture module 805 may thus associate the mobile device 125 and the wearable device 105 with one another and with the user's account. The user may enter, and periodically update, personal information, information about the animal wearing the wearable device 105, and preferences associated with the account. The preferences may include information related to animal discipline, diet, exercise, activities, locations, social interaction, and the like. The preferences may also include personal information related to the user: age, activity level, occupation, and the like.

The location module 810 may be configured to receive location information sent from the wearable devices 105 and the wireless device 125. In some examples, the location module 810 is configured to maintain historic records of a wearable device's 105 location, which may be used by the data capture module 805 to generate user content. The location module 810 may also be configured to notify the mobile device 125 if a specific location criterion is met (e.g., a wearable device 105 is determined to be outside a designated area).

The training module 815 may be configured to store or record user preferences for various training regimens. The training module 815 may also be configured to implement training regimens on behalf of the user. Training regimens may be uploaded from the mobile device 125 and stored within the training module 815, or a user may select from a variety of training regimens hosted within the training module 815. In some examples, the training module may be configured to communicate a training regimen to a wearable device 105. For instance, the training module 815 may facilitate a training regimen related to a dog's indoor behavior, as described above with reference to FIG. 2A. The training regimens may be based on "clicker training" and variants thereof, or they may be based on other accepted regimens used in the art.

The memory module 845 may include random access memory (RAM) or read-only memory (ROM), or both. The memory module 845 may store computer-readable, computer-executable SW code 850 containing instructions that are configured to, when executed, cause the processor module 840 to perform various functions described herein (e.g., receiving data from a wearable device 105, generating user content, receiving contextual data from a third-party server, etc.). In other examples, the SW 850 is not directly executable by the processor module 840, but is configured to cause a computer (e.g., when compiled and executed) to perform the functions described herein. The processor module 840 may include an intelligent hardware device, e.g., a central processing unit (CPU), a microcontroller, an application-specific integrated circuit (ASIC), or the like. The various functions of the modules of the data capture module 805, location module 810, or the training module 815 may be implemented as an aspect of the processor module 840 or as processor-executable instructions stored in the memory module 845.

Figure 9:
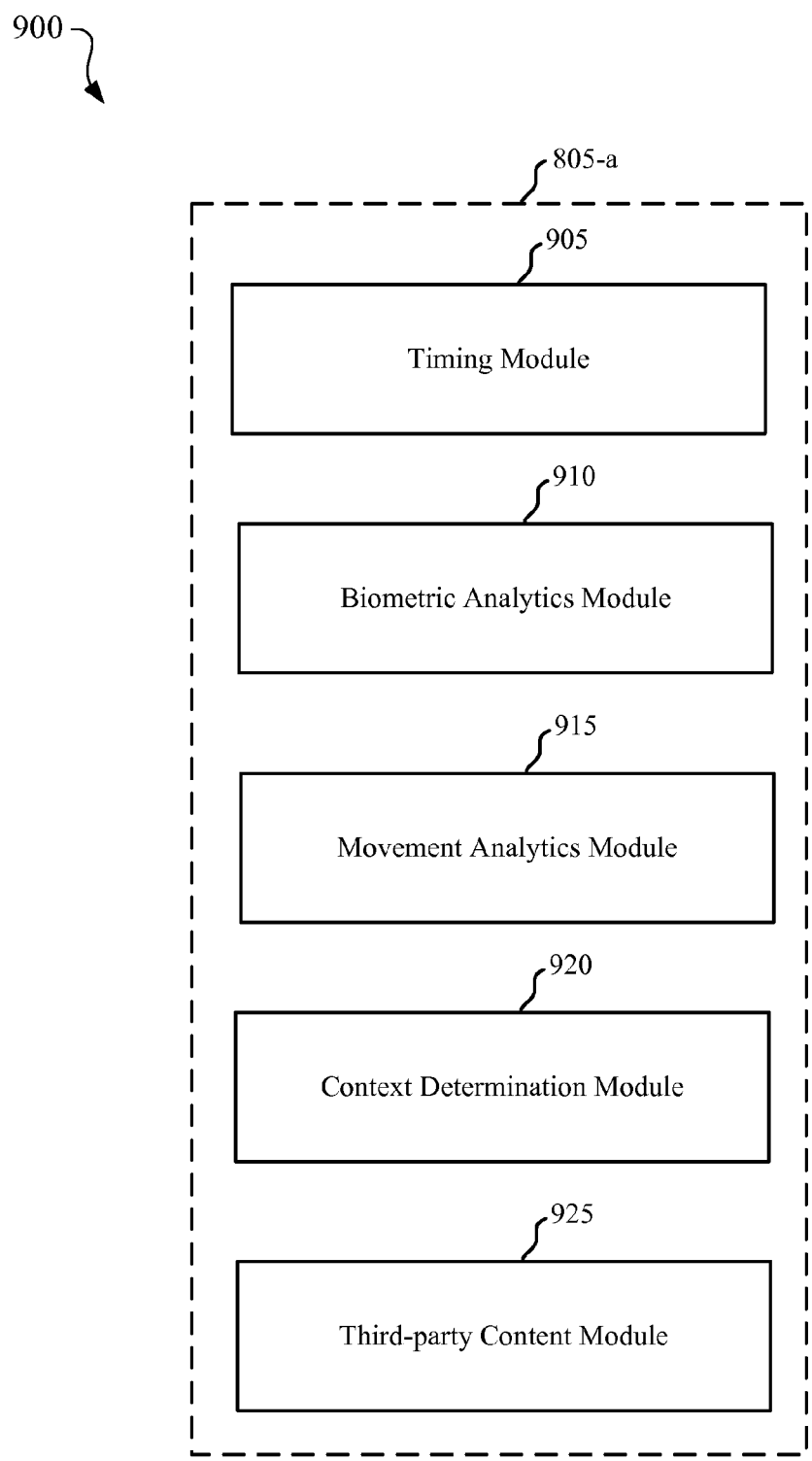
FIG. 9 illustrates an example data capture module that supports data acquisition, reporting, and feedback with an animal collar in accordance with various aspects of the present disclosure.

FIG. 9 shows a block diagram 900 of an example data capture module 805-*a* configured for utilizing data from a wearable device 105. The data capture module 805-*a* may include a timing module 905, a biometric analytics module 910, a movement analytics module 915, a context determination module 920, or a third-party content module 925.

The timing module 905 may be configured to control when data is retrieved from wearable devices 105. For example, the timing module 905 may be configured to accept a user input regarding a periodicity of reporting. Additionally or alternatively, the timing module 905 may be configured to prompt a wearable device 105 to report acquired data.

The biometric analytics module 910 may be configured to identify, store, and analyze biometric data received by the server 170-*b* from a wearable device 105. For example, the biometric analytics module 910 may be configured to analyze data related to heart rate, caloric intake, energy usage, body temperature, and the like, which may be acquired by and reported from a wearable device 105.

The movement analytics module 915 may be configured identify, store, and analyze data related to movement or motion of an animal as reported by a wearable device 105. For example, the movement analytics module, in combination with the location module 810, may be configured to determine whether and how much an animal has moved in a given time period. The movement analytics module 915, in combination with other modules, may also be configured to recommend various exercises or exercise schedules to a user; and the recommended exercise schedules may be based on historic movement patterns, recent amounts of movement, or the like.

The context determination module 920 may be configured to determine and recommend contextual programming to a user. For example, the context determination module 920 may be configured to recommend activities, exercise, feeding schedules and the like, based on information received from other modules. The context determination module 920 may, for instance, receive information from the timing module 905, biometric analytics module 910, movement analytics module 915, location module 810, or the training module 815. The received information may relate to frequency of information reporting, biometry, recent movement, present location, current training regimen, and the like. The context determination module 920 may be configured to recommend activities or programming to a user based on this information. For instance, the context determination module 920 may be configured with user preferences, current events, and presently accepted veterinary practices (e.g., by access to various databases), and the context determination module 920 may draw on these resources to develop recommendations.

The third-party content module 925 may be configured to request and receive data related to veterinary practices, current events, weather, and the like from third-party, internet-connected servers. The third-party content module 925 may be configured receive such information, determine its relevance to a user, e.g., by comparison and analysis of user preferences, and it may provide data or recommendations to a user accordingly.

By way of example, the server 170-*b*, utilizing its various modules and submodules, may receive data and generate content for a user. For example, as shown in FIG. 8, the wearable devices 105 may report acquired data. For example, the wearable devices may report a current heart rate, a current rate of movement, a present location, and a distance between the wearable devices 105. The server 170-*b* may receive the data, and the various modules may store and analyze the data as discussed above. The server 170-*b* may then update an application on the mobile device 125-*f* based on the received information. For instance, the application of the mobile device 125-*f* may receive the data and display charts, graphs, maps, figures, or other user display, indicative of the data. A user of the system 800— e.g., an owner of the of the wearable device 105 and the mobile device 125-*f*—may thus be updated with present data about animals wearing the wearable devices 105.

The server 170-*b* may also provide recommendations to the application of the mobile device 125. For instance, the server 170-*b* may determine that the current season of the year (e.g., spring), the city and state of the user (e.g., Boulder Colo.), the weather forecast (e.g., mid-70s and sunny), and the breed of dog (e.g., Labrador retriever), in combination with the data received from a wearable device 105 all suggest that a trail run may be helpful and enjoyable for the animal wearing the wearable device 105, and for the owner of the animal. The server 170-*b* may thus recommend, via the mobile device 125 application, that the owner take her dog for a trail run.

In some cases, the server 170-*b* may offer additional contextual recommendations. For example, the server 170-*b* may determine that a highly reviewed coffee shop is in the vicinity of the mobile device 125 (e.g., near the user's present location). The server 170-*b* may further determine that an animal wearing a wearable device 105 is due for a walk of an approximate distance to the coffee shop, e.g., based on data received from the wearable device 105. The server 170-*b* may thus provide a recommendation to the mobile device 125 that the user visit the coffee shop while walking her dog. In some examples, the server 170-*b* also provides a coupon for use at the coffee shop. For instance, the operator of the system 800 may offer to incorporate the coffee shop into recommendations if the coffee shop offers users of the system 800 a discount.

In other examples, the server 170-*b* may store data indicative of the time a wearable device 105 and a mobile device 125 are in communication. The server 170-*b* may thus report to a user the amount of time spent with her dog. The server 170-*b* may also store such times for multiple users associated with a common wearable device 105. For instance, multiple users may share an account. The server 170-*b* may record the time a wearable device 105 spends in proximity to the mobile device 125 associated with each user. A couple, for example, may each play with their dog at different times in a day or at different times of a week. The server 170-*b* may notify either or both parties of the couple of their respective time spent with the dog.

In some examples, a mobile device 125 (e.g., an application of the mobile device) may be configured with modules described with reference to the server 170-*a*. A mobile device 125 may thus be configured to implement the functions of the modules described with reference to FIGS. 8 and 9.

Figure 10:
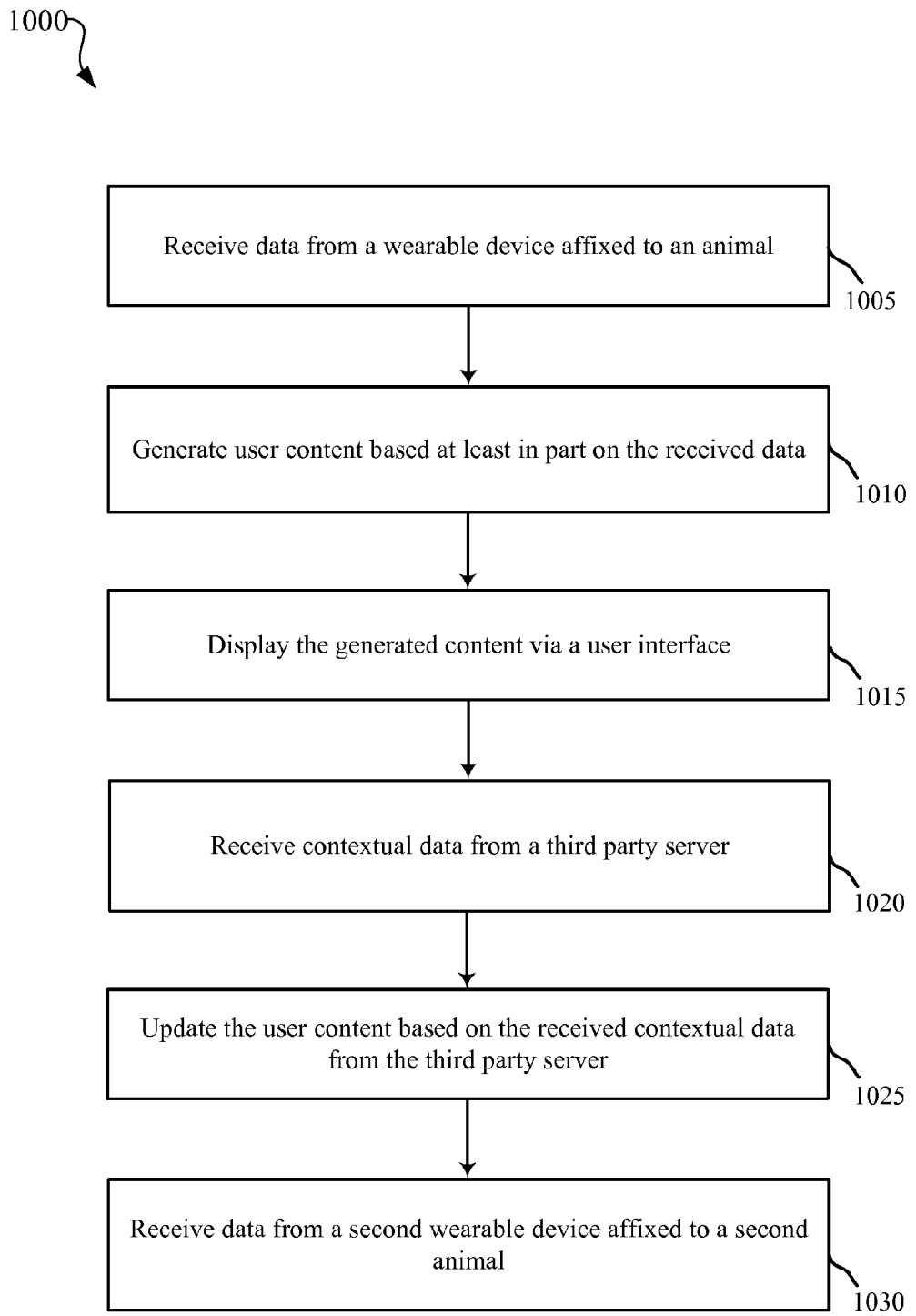
FIGS. 10-12 illustrate example methods of data acquisition, reporting, and feedback with an animal collar in accordance with various aspects of the present disclosure.

FIG. 10 shows a flow chart illustrating a method 1000 for utilizing data acquired from a wearable device. The method 1000 may be implemented by various components or modules of the servers 170 and mobile device 125 described with reference to the preceding figures.

At block 1005, the method 1000 may include receiving data from a wearable device affixed to an animal. At block 1010, the method may include generating user content based at least in part on the received data. At block 1015, the method may involve displaying the generated content via a user interface. At block 1020, it may include receiving contextual data from a third-party server. At block 1025, it may include updating the user content based on the received contextual data from the third party server. At block 1030, the method may include receiving data from a second wearable device affixed to a second animal.

Figure 11:
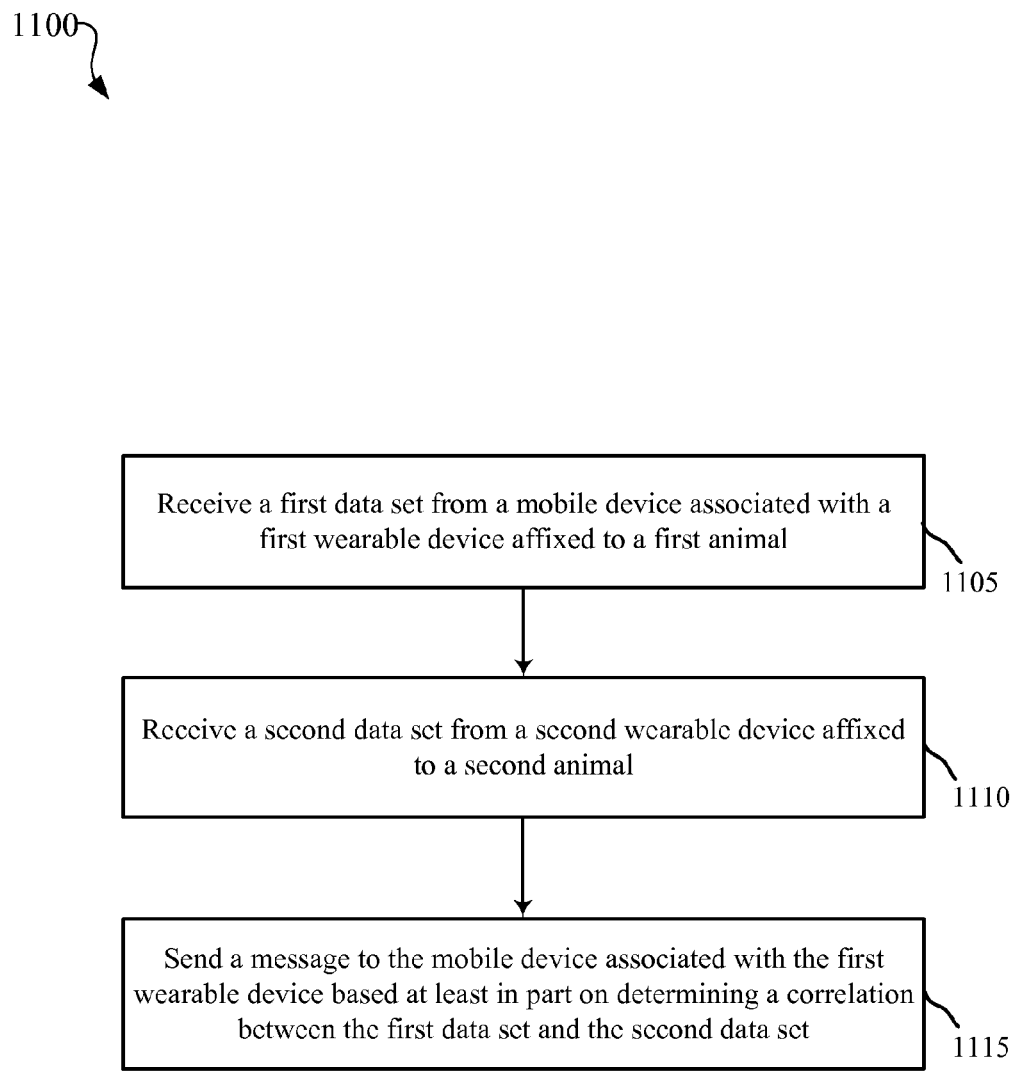

FIG. 11 shows a flow chart illustrating a method 1100 for utilizing data acquired from a wearable device. The method 1100 may be implemented by various components or modules of the servers 170 and mobile device 125 described with reference to the preceding figures.

The method 1100 may include, at block 1105, receiving a first data set from a mobile device associate with a first wearable device affixed to a first animal. At block 1110, it may include receiving a second data set from a second wearable device affixed to a second animal. At block 1115, the method may involve sending a message to the mobile device associated with the first wearable device based at least in part on determining a correlation between the first data set and the second data set.

Figure 12:
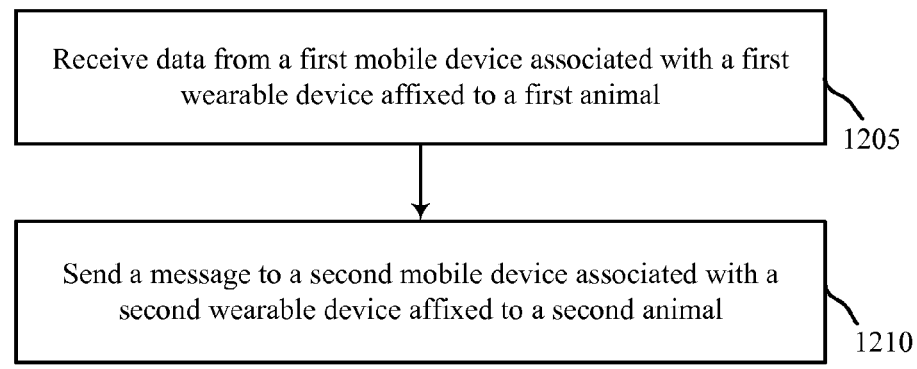

FIG. 12 shows a flow chart illustrating a method 1200 for utilizing data acquired from a wearable device. The method 1200 may be implemented by various components or modules of the servers 170 and mobile device 125 described with reference to the preceding figures.

The method 1200 may include, at block 1205, receiving data from a first mobile device associated with a first wearable device affixed to a first animal. At block 1210, the method may include sending a message to a second mobile device associated with a second wearable device affixed to a second animal.

Figure 13:
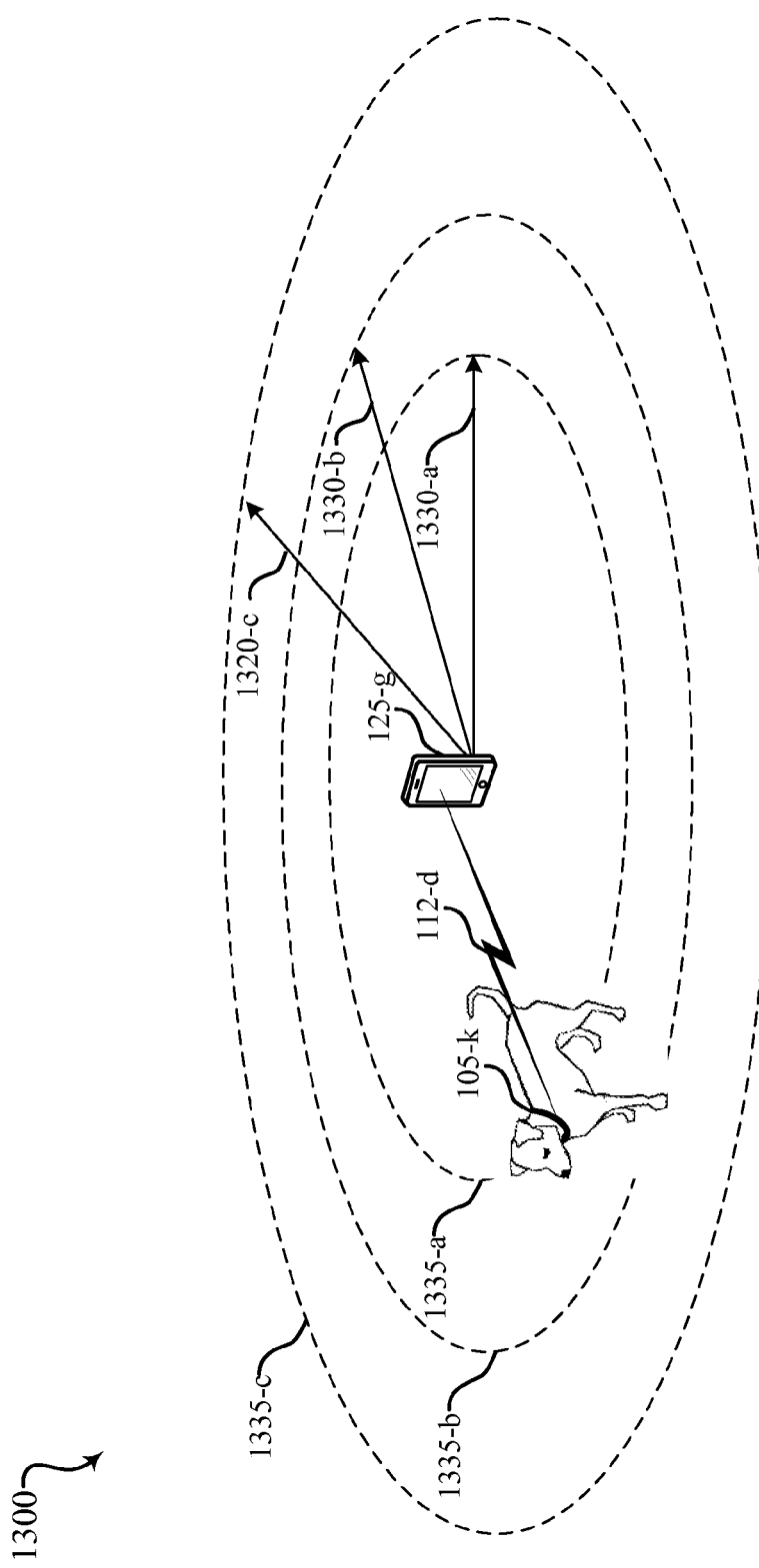
FIG. 13 illustrates an example system that supports data acquisition, reporting, and feedback with an animal collar in accordance with various aspects of the present disclosure.

FIG. 13, an example cordless animal leash system 1300. The system 1300 may include a collar 105-*k* in communication via communication link 112-*d* with and a mobile device 125-*g*. Each of these may be examples of corresponding aspects described with reference to the preceding figures.

The communication link 112-*d* may include forward and reverse link channels between the mobile device 125-*g* and the collar 105-*k*. In some examples, such communications may be referred to as uplink and downlink communications. The communication link 112-*d* may be cellular, WLAN, or WPAN communications. In some examples, the communication link 112-*d* is Bluetooth link.

A user of the mobile device 125-*g* may establish a radius about the mobile device 125-*g* beyond which the collar 105-*k*, and thus the dog to which the collar 105-*k* is affixed, should not travel. For example, a user may wish to keep the collar 105-*k* within a six foot radius of the user. This may be equivalent to maintaining the dog on a six foot leash. The user may thus set a distance 1330 (e.g., six feet), beyond which the user prefers the collar 105-*k* not pass. Each distance may correspond to a user-defined area 1335, which may be a virtual perimeter about the mobile device 125-*g* corresponding to the user-defined distance 1330. In some cases, a user may set several distances 1330 or the distance 1330 may be dynamic. For instance, the distance 1330 may vary with time of day, geographic location, proximity to other animals, or the like. In some cases, the user of the mobile device 125-*g* may set a distance 1330-*b*, which may increase or decrease according to a user-defined or environmental factor. The mobile device 125-*g* may be equipped with an application that provides a user interface with which the user may set a distance 1330.

Because the distance 1330 is defined with respect to the mobile device 125-*g*, the user-defined area 1335 moves with the mobile device 125-*g*. That is, the area in which the dog is allowed to roam may remain the same, but the location of that area 1335 moves with the mobile device 125-*g* (e.g., as the owner moves). The confines of the dog may therefore be related to the mobile device 125-*g*, not a global or coordinate based area.

The mobile device 125-*g* may determine a distance between the collar 105-*k* and the mobile device 125 utilizing communication link 112-*d*. For example, the mobile device 125-*g* may perform a ranging operation, which may include transmitting a signal to the collar 105 via communication link 112-*d*. The signal may be, for instance, a Bluetooth or ZigBee signal. The collar 105-*k* may transmit a signal responsive to the ranging signal, which may be received by the mobile device 125-*g*. The mobile device 125-*g* may determine a distance between the mobile device 125-*g* and the collar 105-*k* based on the signal received from the collar 105 or the signal transmitted from the mobile device 125-*g*.

The mobile device 125-*g* may, for instance, calculate a time or times of flight of the signals, and it may determine a distance (or an approximate distance) between the mobile device 125-*g* and the collar 105-*k* based on the time or times of flight.

If the distance between the collar 105-*k* and the mobile device 125-*g* exceeds the user-defined distance 1330, the mobile device 105-*k* may provide a feedback signal to the collar 105-*k*. For instance, the mobile device 125-*g* may transmit a signal to the collar 105-*k* commanding the collar 105-*k* to emit a sound, initiate a vibration, or to initiate other attention-gaining stimulus. Thus, if the collar 105-*k*, and by implication the dog wearing the collar 105-*k*, ventures beyond a user-defined area 1335, the collar 105-*k* will provide feedback to the dog wearing the collar 105-*k*. In some examples, the intensity of the feedback may increase as the distance between the collar 105-*k* and the mobile device 125-*g* increases. For example, additional stimulus may be introduced—if sound alone is ineffective, vibration or other stimulus, such as illumination, may be utilized. In some examples, sound feedback may be louder or vibration feedback more pronounced as the distance between the collar 105-*k* and the mobile device 125-*g* increase beyond the user-defined distance.

In some examples, a user of the mobile device 125-*g* may enter a user-defined distance 1330, which may be sent to the collar 105-*k*. The collar 105-*k* may thus initiate a ranging operation as discussed above, and the collar may determine whether the determined distance between the collar 105-*k* and the mobile device 125-*g* exceeds a user-defined distance 1330. In such cases, the collar 105-*k* may initiate and provide a feedback signal to the animal wearing the collar 105-*k*.

Figure 14:
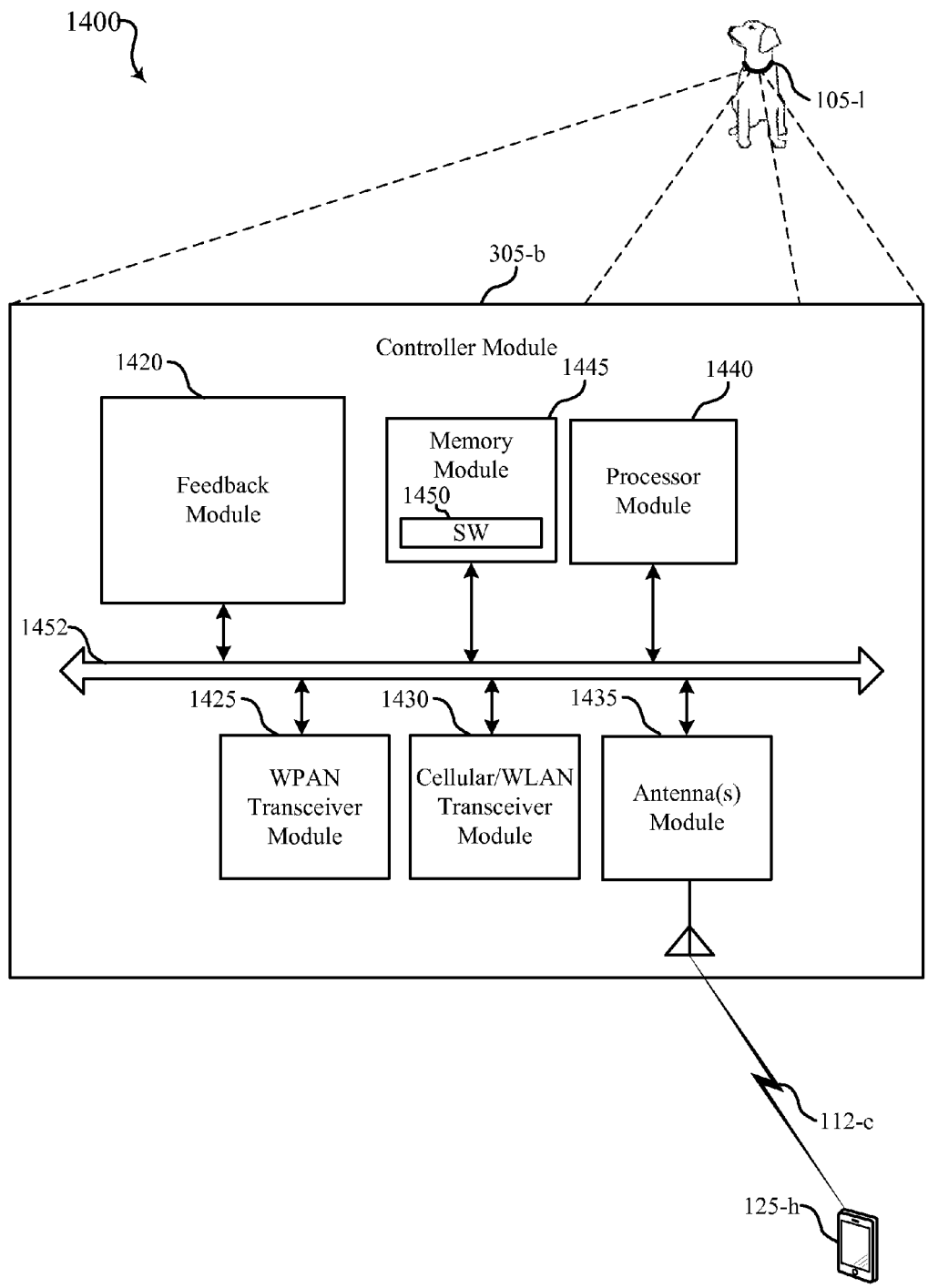
FIG. 14 illustrates an example system, including an animal collar and controller, that supports data acquisition, reporting, and feedback with an animal collar in accordance with various aspects of the present disclosure.

FIG. 14 shows a system 1400 configured for animal control and maintenance. The system 1400 may include a collar 105-*l*, which may be in communication via communication link 112-*e* with a mobile device 125-*h*. The various aspects of the system 1400 may be examples of corresponding devices of system 100 and 1300 of FIGS. 1 and 13.

The collar 105-*l* may include a controller module 305-*b*, which, in turn, may include a feedback module 1420, a WPAN transceiver module 1425, a cellular or WLAN transceiver module 1430, an antenna(s) module 1435, a processor module 1440, or a memory module 1445 (including software (SW) 1450). Each of these modules may be in communication with one another, e.g., via one more buses 1452.

The collar 105-*l* may also be configured with an energy storage device (e.g., an energy store), which may be in electrical communication with, and may provide power to various components of the collar 105-*l*. For instance, the collar 105-*l* may be configured with one or more rechargeable batteries (e.g., Li-ion, NiMH, etc.), alkaline batteries, supercapacitors, ultracapacitors, or the like.

The controller module 305-*b* may include components for bi-directional data communications, including components for transmitting communications and components for receiving communications. The transceiver modules 1425 and 1430 may be configured to communicate bi-directionally, via the antenna(s) module 1435 or one or more wired or wireless links, with one or more mobile devices 125, as described above. For instance, each of the transceiver modules 1425 and 1430 may include a modem configured to modulate packets and provide the modulated packets to the antennas via the antenna(s) module 1435 for transmission; and the modems may be configured to demodulate packets received from the antennas via the antenna(s) module 1435. The controller module 305-*b* (or the collar 105-*l* more generally) may include one or several antennas capable of concurrently transmitting or receiving different wireless communications. In some examples, the controller module 305-*b* is configured to concurrently communicate with cellular networks, WLANs, or WPANs, utilizing one or more of the communications protocols described above.

The memory module 1445 may include random access memory (RAM) or read-only memory (ROM), or both. The memory module 1445 may store computer-readable, computer-executable software/firmware code 1450 containing instructions that are configured to, when executed, cause the processor module 1440 to perform various functions described herein (e.g., transmitting/receiving ranging signals, determining distances, identifying user-defined distances, etc.). In other examples, the software/firmware code 1450 is not directly executable by the processor module 1440, but is configured to cause a computer (e.g., when compiled and executed) to perform the functions described herein. The processor module 1440 may include an intelligent hardware device, e.g., a central processing unit (CPU), a microcontroller, an application-specific integrated circuit (ASIC), or the like.

In some examples, the SW code 1450 includes instructions related to a user-defined distance or area, as discussed above with reference to FIG. 13. For example, a user-defined distance may be based on a time of day or location. In some examples, the controller module 305-*b* (e.g., via the processor module 1440) may determine a time of day and implement an associated user-defined distance for determining whether the collar 105-*l* is within a user-defined area. In other examples, the mobile device 125-*h* may indicate to the controller module 305-*b* that the mobile device 125-*h* and the collar 105-*l* are within a location corresponding to a particular user-defined distance, and the controller module 305-*b* may implement an associated user-defined distance.

The feedback module 1420 may be configured to provide audible, visual, or mechanical feedback to an animal wearing the collar 105-*l*. For instance, the feedback module 1420, in conjunction with the processor module 1440, may provide feedback to a dog (e.g., sounds or vibration) to encourage or discourage behavior, as discussed above with reference to FIG. 13.

Figure 15:
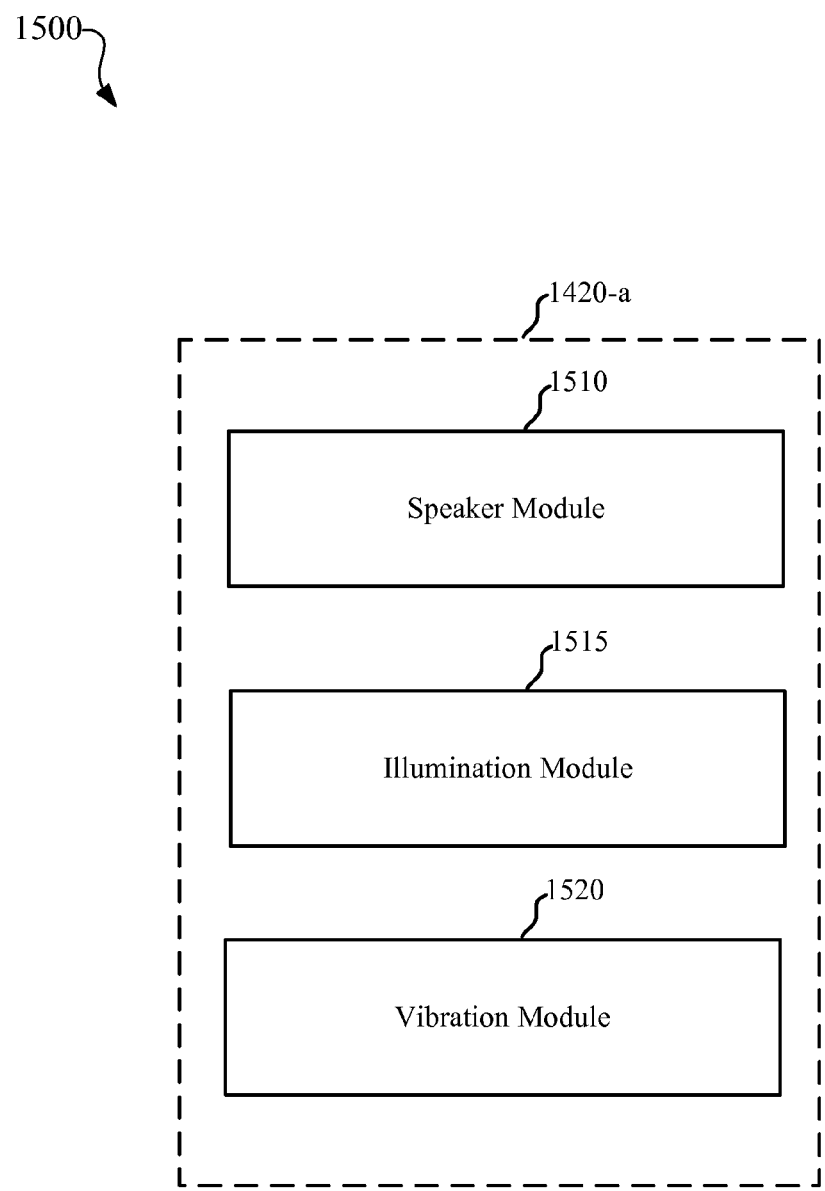
FIG. 15 illustrates an example data feedback module that supports data acquisition, reporting, and feedback with an animal collar in accordance with various aspects of the present disclosure.

FIG. 15 shows a block diagram 1500 of an example feedback module 1420-*a* configured for providing feedback to animal wearing a collar 105. The feedback module 1420-*a* may include a speaker module 1510, an illumination module 1515, or a vibration module 1520. While the block diagram 1500 depicts collocated submodules of the feedback module 1420-*a*, those skilled in the art will recognize that other arrangements of the modules and submodules are possible.

The speaker module 1510 may be configured with one or several speakers, which may be configured to transmit sounds of different or varying frequencies. In some cases, the speaker module 1510 may be configured to emit sounds at a frequency audible only to dogs, while in other examples, the speaker module 1510 may include wideband speakers configured to emit sounds across the spectrum audible to humans. Components of the controller module 305-*b* may use the speaker module 1510 to provide feedback—for example, as aspect of a sound-based dog training methodology, such as clicker training, or a variant thereof. In some examples, the speaker module 1510 may be configured to allow a user of the mobile device 125-*e* (FIG. 14) to audibly communicate with an animal wearing the collar 105-*l*. For instance, the user may speak a command into the mobile device 125-*e* as though the user were engaging in a telephone call, and the command may be relayed to the speaker module 1510 via aspects of the system 1400 and the controller module 305-*b*.

In some cases, the speaker module 1510 may output a noise meant to be displeasing, such as a high-pitched noise. This displeasing noise may be used to create a negative association with an activity which prompted the noise, or to dissuade an activity from occurring. The noise may thus be utilized as feedback for a dog that exceeds a user-defined distance, as discussed above. In some cases, the speaker module 1510 may output a noise meant to be pleasing or marking, such as a click or a noise of a specific pitch. Further, the speaker module 1510 may output specific noises, such as noises stored in the memory module 245. In some cases, noises may be recorded and saved to the memory module 245.

In some examples, the illumination module 1515 is configured to provide visual feedback to a dog wearing the collar 105-*l*. The illumination module 1515 may thus be configured with luminaires (e.g., light emitting diodes (LEDs)) arranged in the line of sight of the dog. Additionally or alternatively, the illumination module 1515 may be configured with luminaires arranged to draw attention to the collar 105-*l*. For example, LEDs may be arranged about the circumference of a collar, which may increase visibility of a dog wearing the collar 105-*l*. Accordingly, feedback provided by the collar 105-*a* or mobile device 125-*e* may include illuminating LEDs about the collar 105-*l*. This may provide a visual indication to both a dog or her owner that the dog has ventured beyond a user-defined distance.

The vibration module 1520 may be configured to vibrate the controller module 305-*b* or the collar 105-*l*. The vibration module 1520 may be, or may include, an electric motor connected to weight, which may be configured to facilitate vibration. The vibration module 1520 may thus be configured with any motor known in the art for providing a vibrating alert. Modules of the controller module 305-*b* may utilize the vibration module to provide mechanical feedback to an animal wearing the collar 105-*l*. In some examples, feedback provided by the collar 105-*l* or the mobile device 125-*e* includes vibration utilizing the vibration module 1520.

In some examples, a recorded command may be used to encourage a dog to return to within a user-defined area utilizing certain dog-training methodologies. For instance, with reference to FIG. 13, a dog wearing a collar 105 may venture outside of a user-defined area. The mobile device 125 or the collar 105 may provide feedback to the dog. The feedback may include a loud sound a sharp vibration, and these may be followed by a verbal (e.g., oral) command recorded by the owner (e.g., "come" or "heel").

Figure 16:
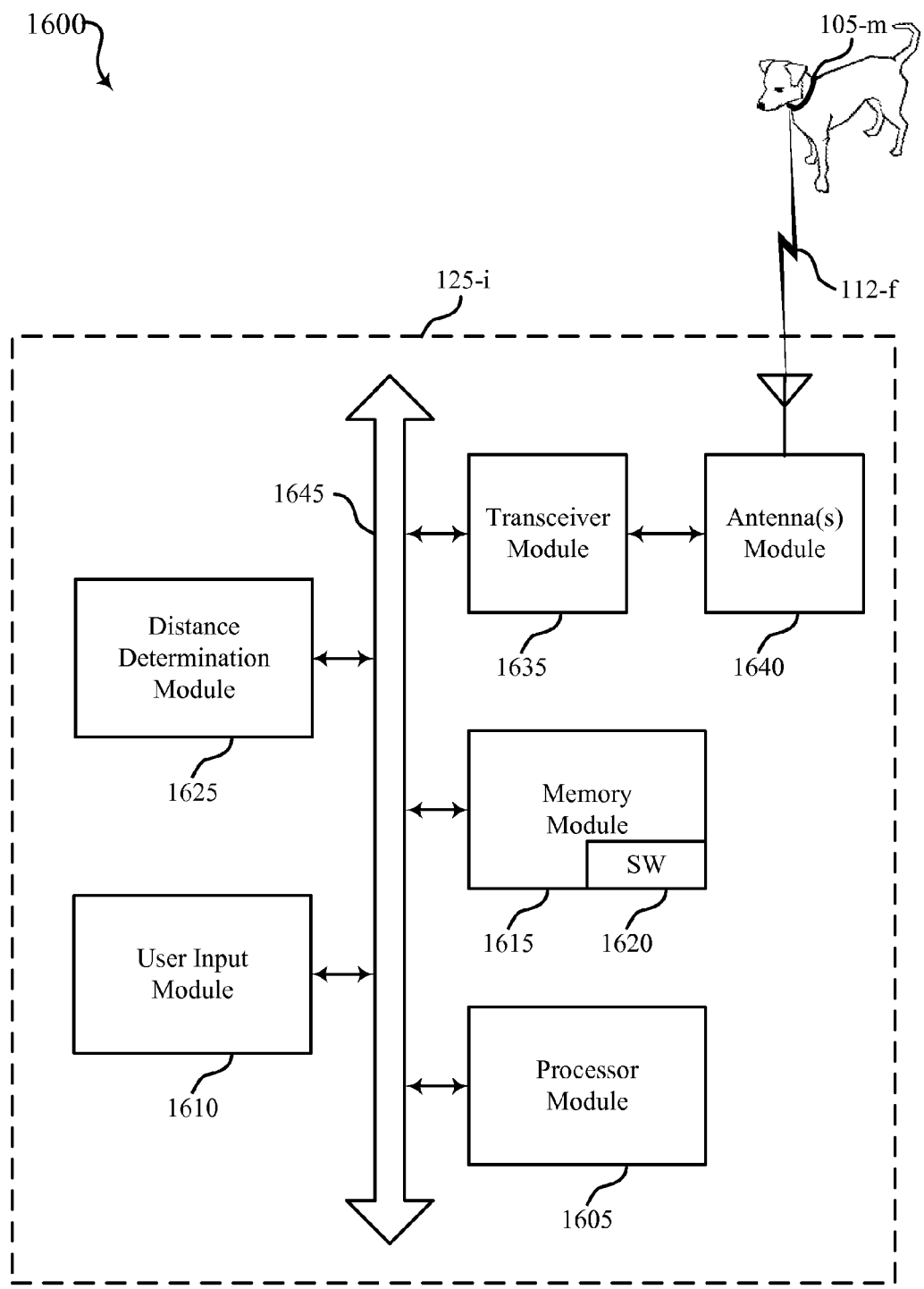
FIG. 16 illustrates an example system, including a wireless communication device, that supports data acquisition, reporting, and feedback with an animal collar in accordance with various aspects of the present disclosure.

In FIG. 16, a block diagram of system 1600 configured for animal control and maintenance is shown. The system 1600 may include a mobile device 125-*i* in communication via communication link 112-*f* with a collar 105-*m*, which may examples of corresponding devices described with reference to the preceding figures.

The mobile device 125-*i* may include a user input module 1610 or a distance determination module 1625. These modules may be configured to receive user-defined distances and determine distances between the collar 105-*m* and the mobile device 125-*i*, as discussed with reference to FIG. 13. The mobile device 125-*i* may include components for bi-directional voice and data communications, including components for transmitting communications and components for receiving communications. For example, mobile device 125-*i* may communicate with the collar 105-*m* via a WPAN link, as discussed above.

The mobile device 125-*i* may also include a processor module 1605, and memory 1615 module (including software (SW) 1620), a transceiver module 1635, and an antenna(s) 1640 which each may communicate, directly or indirectly, with each other (e.g., via one or more buses 1645). The transceiver module 1635 may be configured to communicate bi-directionally, via the antenna(s) 1640 or one or more wired or wireless links, with a collar 105, as described above. The transceiver module 1635 may include a modem configured to modulate the packets and provide the modulated packets to the antenna(s) 1640 for transmission, and to demodulate packets received from the antenna(s) 1640.

The memory 1615 may include random access memory (RAM) or read only memory (ROM). The memory 1615 may store computer-readable, computer-executable software/firmware (SW) code 1620 containing instructions that are configured to, when executed, cause the processor module 1605 to perform various functions described herein (e.g., transmit/receive a ranging signal, determine a distance, provide feedback, etc.). Alternatively, the SW code 1620 may not be directly executable by the processor module 1605 but may be configured to cause a computer (e.g., when compiled and executed) to perform functions described herein. The processor module 1605 may include an intelligent hardware device, e.g., a CPU, a microcontroller, an ASIC, etc.

Figure 17:
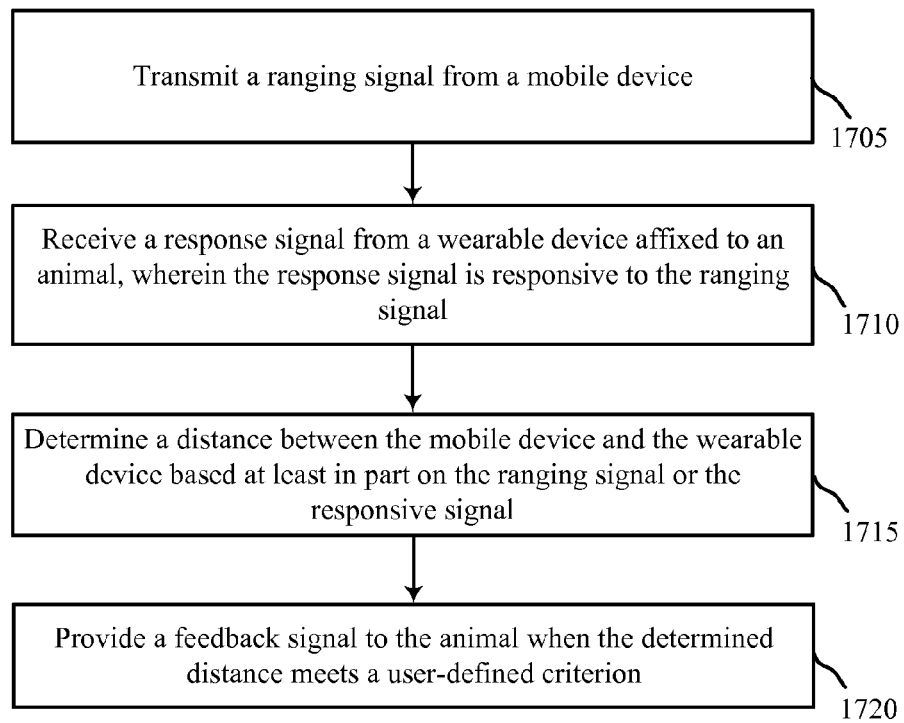
FIG. 17 illustrates an example method of data acquisition, reporting, and feedback with an animal collar in accordance with various aspects of the present disclosure.

Next, in FIG. 17, a flow chart depicts a method 1700 of animal control and maintenance. The method 1700 may be implemented using, for example, the systems and 100, 1300, 1400, and 1600 of FIGS. 1, 13, 14, and 16.

At block 1705, the method may include transmitting a ranging signal. For example, the operations at block 1705 may be performed by the distance determination module 1625 or the transceiver module 1635 of FIG. 16.

At block 1710, the method may include receiving a response signal from a wearable device affixed to an animal. The response signal may be responsive to the ranging signal. For example, the operations at block 1710 may be performed by the distance determination module 1625 or the transceiver module 1635 of FIG. 16.

At block 1715, the method may include determining a distance between the mobile device and the wearable device based at least in part on the ranging signal or the responsive signal. For example, the operations at block 1715 may be performed by the distance determination module 1625 of FIG. 16.

At block 1720, the method may include providing a feedback signal to the animal when the determined distance meets a user-defined criterion. For example, the operations at block 1720 may be performed by the processor module 1605 or the transceiver module 1635 of FIG. 16. Additionally or alternatively, the operations at block 1720 may be performed by the speaker module 1510, the illumination module 1515, or the vibration module 1520 of FIG. 15.

Figure 18:
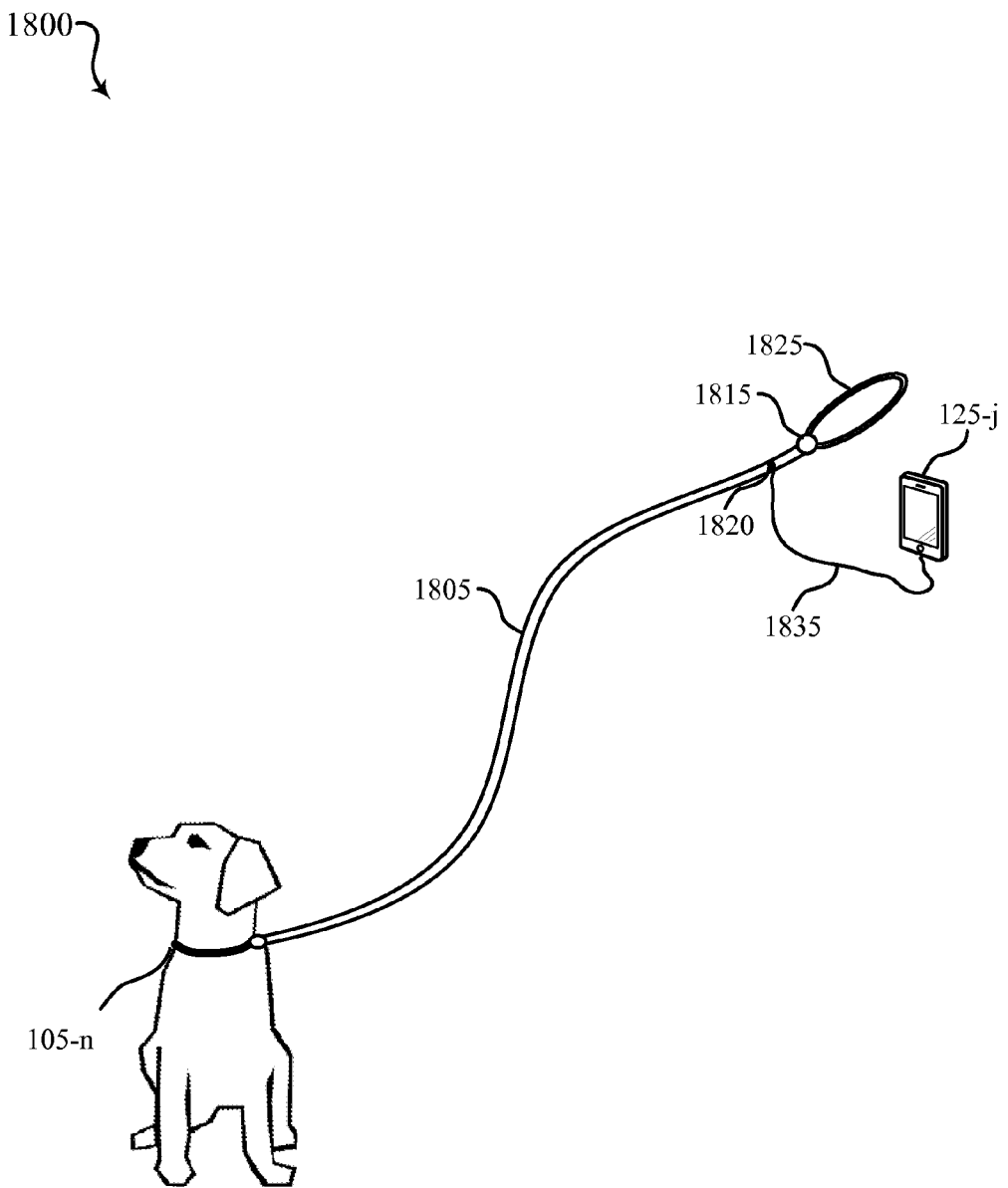
FIG. 18 illustrates an example an energy storage and charging system that supports data acquisition, reporting, and feedback with an animal collar in accordance with various aspects of the present disclosure.

FIG. 18, an animal control system 1800 is illustrated. The system 1800 includes a leash 1805 and a collar 105-*n*, both of which may include electronic circuitry or an energy store. The collar 105-*n* may be an example of the collars 105 described with reference to the preceding figures. The leash 1805 may have a controller module 1815, an electrical connector 1820 for charging and communicating with other electronic devices, and a handle 1825. The system 1800 may include a portable electronic or mobile device 125-*j*, which may be an example of the mobile devices 125 described with reference to the preceding figures, and which may be connected to the electrical connector 1820 with a removable charging cord 1835.

As explained below, the leash 1805 may be configured with an energy store, which may include batteries, supercapacitors, ultracapacitors, or the like. In some cases, much or all of the leash 1805 is configured with energy storage devices. The controller module 1815 may manage charging and discharging of the energy store within the leash. The handle 1825 may be used to control the leash 1805 when attached to an animal through the collar 105-n.

The leash 1805 may also include sensors and outputs, which the controller module 1815 may also control or supervise. For example, the leash may include luminaires, which may illuminate an area or a specific location—e.g., an area below or around a dog. In some cases, the leash 1805 may include a sensor (e.g., a transducer) to determine tension in the leash and trigger an output from the collar 105-n or the leash 1805, based on the tension exceeding a threshold. For instance, the collar 105-n may be equipped with, e.g., a speaker, and the leash 1805, the collar 105-n, or a mobile device 125-j, may utilize the speaker to emit a sound based upon a triggering signal from the tension sensor of leash 1805. In some examples, the leash 1805 may be an aspect of a retractable leash system. For instance, the leash 1805 may be used in combination with a reel that allows an effective length of the leash 1805 to be increased or decreased. In some cases, the leash 1805 may power operations of a retractable leash system.

The collar 105-n may include electronic circuitry and an energy store (e.g., batteries) for which the leash 1805 may be used to recharge. The collar 105-n may include various data acquisition and output devices, including devices for monitoring location, motion, sound, biometry and the like; and it may include luminaires, speakers, vibrators, and the like for providing feedback to an animal wearing the collar 105-n, as described above.

In some cases, it may be desirable for the collar 105-n to remain on the animal at nearly all times. For example, animals may learn to be obedient when a training collar is worn because the animal may learn that the collar is what delivers certain positive and negative feedback. Additionally or alternatively, the collar 105-n may be used to acquire data about a dog wearing the collar 105-n as described above.

By recharging the collar 105-n while the animal is wearing the collar 105-n, the collar 105-n does not need to be removed, thus avoiding a lack of obedience while the collar 105-n is unworn or avoiding periods during which data is unable to be collected. It may, however, be difficult or dangerous to attempt to connect the collar to a stationary power source while animal is wearing the collar 105-n. Utilizing the leash 1805 to recharge the collar 105-n may thus allow the collar 105-n to remain on an animal. As mentioned, the transfer of energy from the leash 1805 to the collar 105-n may occur during a leashed walk with the animal, which may minimize scheduling disruptions for charging. The lease 1805 may be able to store enough energy to, at times, simultaneously charge or operate a mobile device 125-j e.g., through the electrical connector 1820.

In some examples, a mobile device 125 may provide input to, and may control operations of the leash 1805. For instance, an application of the mobile device 125-j may control charging operations of the leash 1805 or it may provide information about energy levels of the leash 1805. Additionally or alternatively, the mobile device 125-j may access memory within the controller module 1815.

Figure 19:
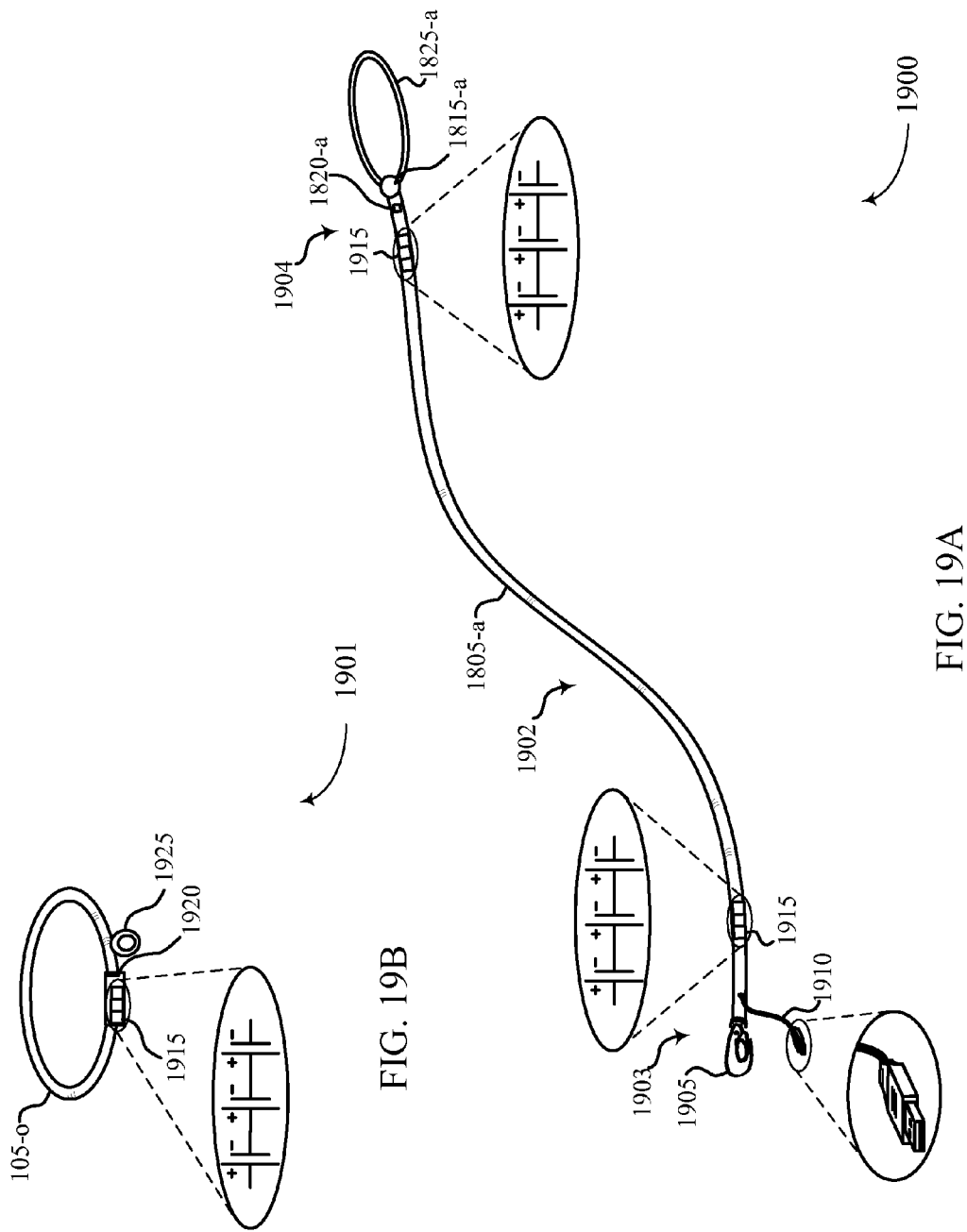
FIGS. 19A and 19B illustrate an example or examples of an energy storage and charging system that supports data acquisition, reporting, and feedback with an animal collar in accordance with various aspects of the present disclosure.

Next, FIGS. 19A and 19B show powered leash and collar systems 1900 and 1901. The system 1900 includes a leash 1805-a, which may be an example of the leash 1805 of FIG. 18. The leash may include a controller module 1815-a, an electrical connector 1820-a, or a handle 1825-a, which may be examples of the corresponding components described in FIG. 18. The leash 1805-a may include a body or body portion 1902 with an attachment end 1903 and a handle end 1904. The body 1902 may be made of plastic, textile, composite, or the like. The body 1902 may be constructed to accommodate bending, rapid changes in tension, and contortion in order facilitate dog walking.

The attachment end may include a mechanical connector 1905 and an electrical connector 1910, which may be connected to, and in electrical communication with, an energy store 1915. The mechanical connector 1905 may be a clip, clamp, loop, hook, or the like; it may be constructed of metal, plastic, composite, etc., and may include a spring-assisted closing mechanism. The mechanical connector 1905 and the electrical connector 1910 may be aspects of a common electro-mechanical connector, which may facilitate mechanical control over and energy transfer to a collar 105.

In some examples, the body 1902 of the leash 1805-a may be an enclosure housing the energy store 1915. The energy store 1915 may include one or several energy storage devices. For example, the energy store 1915 may include several batteries, supercapacitors, or ultracapacitors connected (electrically or physically) in series. In some cases, the energy store 1915 may be configured to extend the entire length of the body 1902. Alternatively, the energy store 1915 may occupy a lesser extent of the body 1902, or it may be housed in an enclosure affixed to the body 1902. The energy storage elements of the energy store 1915 may be configured to distribute weight evenly throughout the body 1902. In some examples, the energy store may include rechargeable batteries (e.g., Li-Ion, NiMH, etc.).

The electrical connector 1910 may be a universal serial bus (USB) connector (e.g., a male USB connector) that is electrically connected to the energy store 1915. The electrical connector 1910 may thus facilitate energy transfer from the energy store 1915 to a device connected to the electrical connector 1910. The electrical connector 1910 may be connected to the energy supply via copper or aluminum wiring, or any other conductor known in the art. The electrical connector 1910 may be mechanically affixed to the attachment end 1903 of the leash 1805-a to facilitate connecting the electrical connector 1910 and the mechanical connector 1905 to the leash 1805-a to the collar 105-n—e.g., as discussed above in FIG. 18.

In some examples, the electrical connector 1910 may be or may incorporate a magnetic connector, which may or may not be based on the USB standard. For instance, the electrical connector 1910 may be or have a magnet, which facilitates connection with another device (e.g., a collar 105). In some examples, the electrical connector 1910 may be a coaxial connector, a two-conductor connector, or the like. The electrical connector 1910 may be connected with an energy source, e.g., a computer, a power supply, an electrical receptacle and power supply, etc., for charging or recharging the energy store 1915.

The electrical connector 1820-a may be a USB connector (e.g., a female USB connector) physically connected to and in electrical communication with the energy store 1915. The electrical connector 1820-a may thus facilitate energy transfer from the energy store 1915 to a device connected via the electrical connector 1820-a (e.g., a mobile device 125-j of FIG. 18). In some examples, the electrical connector 1820-*a* may be a coaxial connector, a two-conductor connector, or the like.

The handle 1825-*a* may be removable, and additional electrical connectors may be affixed to or extend from the handle end 1904 of the leash 1805-*a*, which may facilitate recharging the energy store 1915. The handle 1825-*a* may be a loop of a variety of shapes and sizes. It may be constructed of the same material as the body 1902, or it may be of a different material type. The handle 1825-*a* may be constructed of plastic, textile, leather, composite, or the like. In some cases, the handle 1825-*a* includes a housing or a retractable spring mechanism or motor to allow the leash 1805-*a* to retract, e.g., into the handle 1825-*a*. Additionally or alternatively, the handle 1825-*a* may be a loop with a breakable portion, which may to facilitate affixing the leash 1805-*a* to an object.

The collar 105-*o* of system 1901 in FIG. 19B may include an energy store 1915, an electrical connector 1920, and a mechanical connector 1925. The collar 105-*o* may be constructed from of plastic, textile, composite, or the like. The collar 105-*o* may be an example of a collar 105 described with reference to the preceding figures (including, the collar 105-*h* of FIG. 3). The energy store 1915 may be used for energy storage or it may be used to power electrical or electronic components of the collar 105-*o*. For example, the energy store 1915 may power data-acquiring or feedback components of the collar 110. The energy store 1915 of the collar 105-*o*, as with the energy store 1915 of the leash 1805-*a*, may be configured with one or several energy storage devices (e.g., batteries, supercapacitors, ultracapacitors, etc.), which may arranged within the collar 105-*o* or affixed to a housing on the collar 105-*o*.

The electrical connector 1920 may be, for instance, a USB connector (e.g., a female USB connector), which may facilitate connection with the electrical connector 1910. In some cases, the electrical connector 1920 may be a magnetic connector, or it may be a coaxial connector, a two-conductor connector, or the like. In any case, the electrical connector 1910 may be connected, affixed, or attached to the electrical connector 1920 to facilitate energy transfer between the energy stores 1915. In some examples, the controller module 1815-*a* may control energy transfer (e.g., recharging) between the energy stores 1915. The leash 1805-*a* may thus be used to recharge the collar 105-*o*.

The mechanical connector 1925 may be a clip, clamp, loop, hook, or the like; it may be constructed of metal, plastic, composite, etc., and may include a spring-assisted closing mechanism. The mechanical connector 1925 may facilitate connection with or fastening by the mechanical connector 1905. The mechanical connector 1925 may be referred to as a leash connector.

Figure 20:
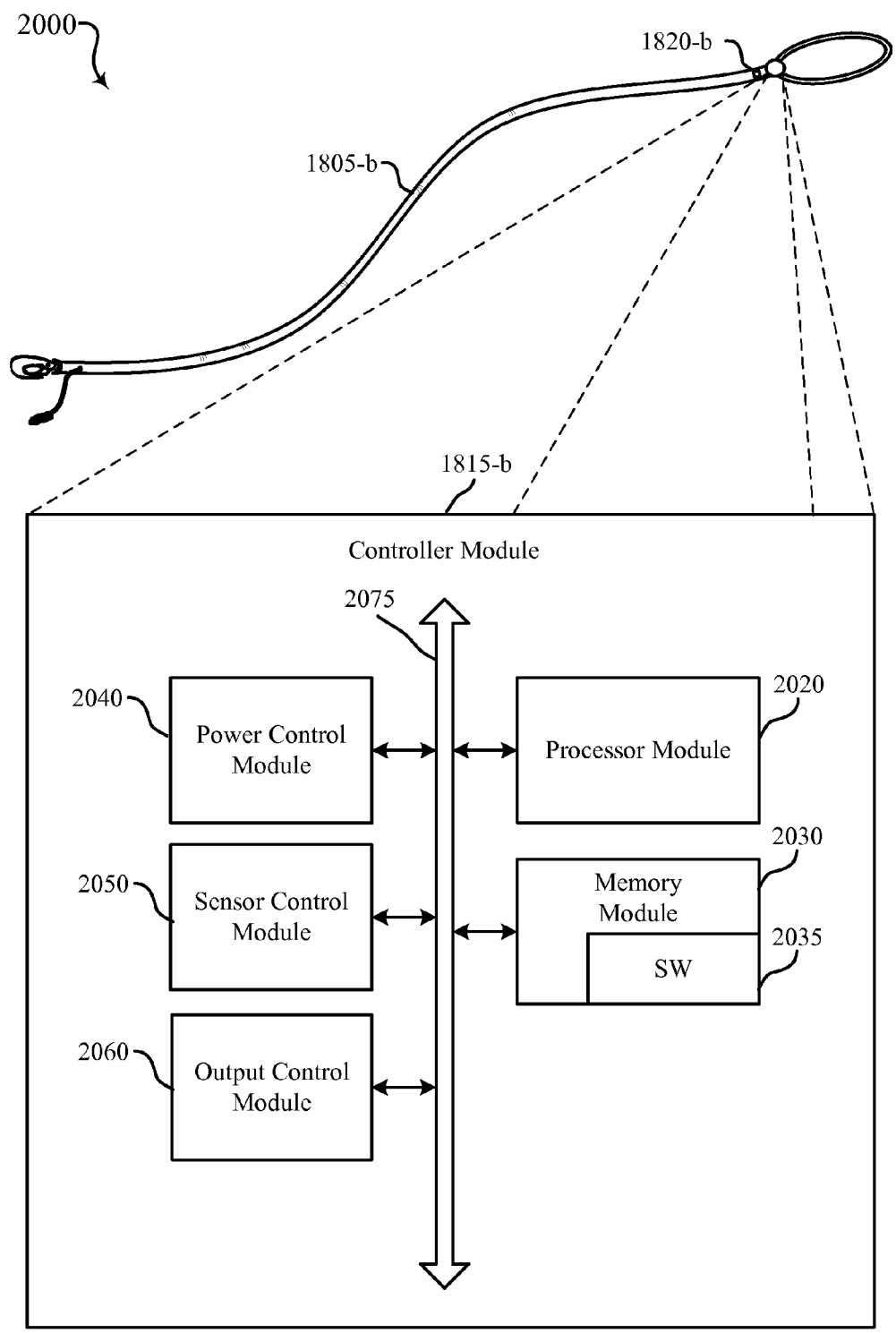
FIG. 20 illustrates an example an energy storage and charging system, including a controller, that supports data acquisition, reporting, and feedback with an animal collar in accordance with various aspects of the present disclosure.

Turning next to FIG. 20, a block diagram 2000 of a power leash 1805-*b* configured for animal control is shown. The leash 1805-*b* may be an example of the leashes 1805 of FIG. 18 or FIG. 19A. The leash 1805-*b* may include a controller module 1815-*b*, which may be an example of the controller module 1815 described in the preceding figures.

The controller module 1815-*b* may include a processor module 2020, a memory module 2030 (including software/firmware (SW) 2035), a power control module 2040, a sensor control module 2050, and an output control module 2060, which each may communicate, directly or indirectly, with each other (e.g., via one or more buses 2075). In some cases, the controller module 1815-*b* may include additional modules (e.g., radios, transceivers, etc.) for wireless for communication. In such cases, the controller module 1815-*b* may include multiple antennas capable of concurrently transmitting or receiving multiple wireless transmissions.

The power control module 2040 may be configured to monitor and control energy levels and charging of the energy store 215 (FIG. 2). The power control module 2040 may thus include voltage or charge regulators. In some cases, the power control module 2040 may be configured to control energy transfer from the energy store 215 to other device, e.g., a collar 110.

The sensor control module 2050 may be configured to monitor and control inputs from sensors of the leash 1805-*b*. For example, if the leash 1805-*b* is configured with a tension sensor, the control module 2050 may receive and process electrical signal from the tension sensor and provide an input to the processor module 2020 to perform various responsive functions.

The output control module 2060 may be configured to monitor and control outputs (e.g., other than energy transfer) from the leash 1805-*b*. As discussed above, the leash 1805-*b* may be configured with luminaires (e.g., LEDs) or speakers. The output control module 2060 may be configured to activate or deactivate such outputs, and it may be configured to control power to such outputs. In some cases, the output control module 2060 is also configured to communicate control signals to a collar 105 (FIG. 18, 19A, or 19B). For example, the output control module 2060 may facilitate responsive signaling to the collar 110 based on inputs received from the sensor control module 2050. The output control module 2060 may also be configured to control communication between the controller module 1815-*b* and a mobile device 125-*j* (FIG. 18), which may be connected to the electrical connector 1820-*b*.

The memory module 2030 may include random access memory (RAM) or read-only memory (ROM), or both. The memory module 2030 may store computer-readable, computer-executable software/firmware code 2035 containing instructions that are configured to, when executed, cause the processor module 2030 to perform various functions described herein (e.g., transfer energy, identify inputs, transfer signals, etc.). In other examples, the software/firmware 2035 is not directly executable by the processor module 2020, but is configured to cause a computer (e.g., when compiled and executed) to perform the functions described herein.

The processor module 2020 may include an intelligent hardware device, e.g., a central processing unit (CPU), a microcontroller, an application-specific integrated circuit (ASIC), or the like. The various functions of the modules of the leash 1805-*b*, described herein, may be implemented as an aspect of the processor module 2020 or as processor-executable instructions stored on the memory 2035. In some cases, the memory module 2030 may include data storage, which may be in electrical communication with, and which may be accessed via the electrical connector 1820-*b*, e.g., by a mobile device 125 (FIG. 18). In some cases, the memory module 2030 includes a reader for external storage, such as flash memory.

It should be noted that the methods, systems and devices discussed above are intended merely to be examples. Various embodiments may omit, substitute, or add various steps, procedures, or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. It will, however, be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory," "memory unit," or "memory module," may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, non-transitory, portable or fixed storage devices, optical storage devices, wireless channels, a SIM card, other smart cards, and various other mediums capable of storing, containing or carrying instructions or data.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory, computer-readable medium. Other examples and implementations are within the scope and spirit of the disclosure and appended claims. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A apparatus for animal monitoring and communication, comprising:
  a controller affixed to an animal collar, wherein the controller comprises:
    a multi-axis accelerometer to recognize motion of an animal wearing the animal collar;
    a vibrator to transmit vibrations to the animal wearing the animal collar; and
    a plurality of transceivers to transmit data acquired by the controller through a wireless communication system, wherein each transceiver of the plurality of transceivers employs a different radio access technology;
  a microphone to receive sounds from the animal wearing the animal collar, wherein the microphone is affixed to the animal collar and is in electronic communication with the controller;
  a speaker to transmit sounds to the animal wearing the animal collar, wherein the speaker is affixed to the animal collar and is in electronic communication with the controller;
  a luminaire to transmit light in a proximity of the animal wearing the animal collar, wherein the luminaire is affixed to the animal collar and is in electronic communication with the controller;
  an energy store affixed to the animal collar and in electronic communication with the controller and the luminaire to power the controller and the luminaire; and
  a leash connector affixed to the animal collar.

* * * * *